Feb. 24, 1942.  W. W. MACFARREN  2,274,452
HIGH SPEED ROTARY FLYING SHEAR
Filed April 10, 1936  10 Sheets-Sheet 1

INVENTOR.
Walter W. Macfarren

INVENTOR.
Walter W. Macfarren

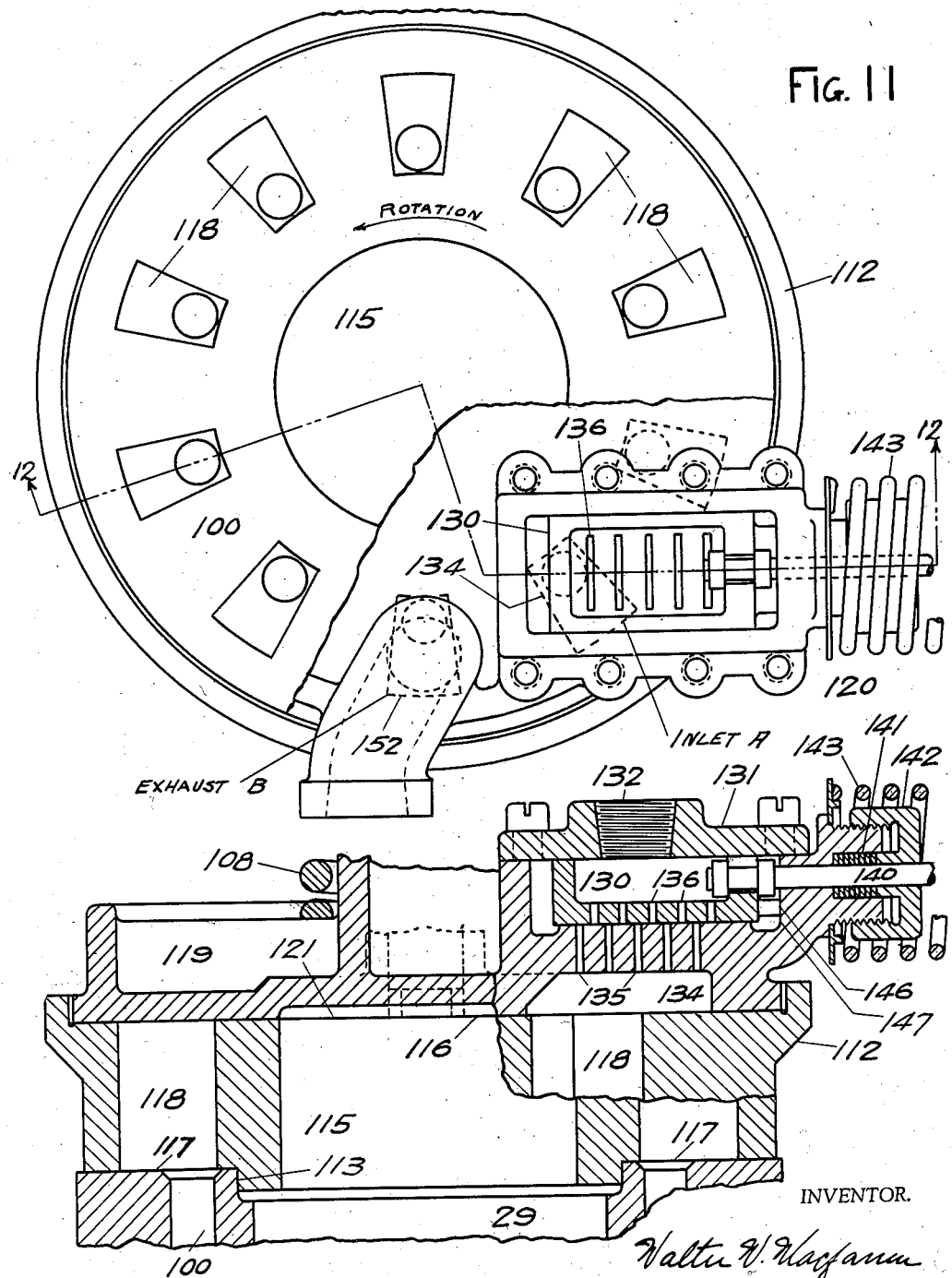

Feb. 24, 1942. W. W. MACFARREN 2,274,452
HIGH SPEED ROTARY FLYING SHEAR
Filed April 10, 1936   10 Sheets-Sheet 7

INVENTOR.
Walter W. Macfarren

Feb. 24, 1942.  W. W. MACFARREN  2,274,452
HIGH SPEED ROTARY FLYING SHEAR
Filed April 10, 1936   10 Sheets-Sheet 8

INVENTOR.
Walter W. Macfarren

Patented Feb. 24, 1942

2,274,452

UNITED STATES PATENT OFFICE 2,274,452

HIGH SPEED ROTARY FLYING SHEAR

Walter W. Macfarren, Los Angeles, Calif.

Application April 10, 1936, Serial No. 73,790

84 Claims. (Cl. 164—68)

My invention relates to flying shears for cutting metal bars in endwise motion into desired sectional lengths, and more particularly to rotary flying shears for operating upon bars directly as they come from a hot mill at speeds from 2500 to 4000 feet per minute, or more.

Such flying shears offer a great saving in the initial and operating costs of so called hot strip mills. The present tendency in the building of such mills is to make them wider as new mills are built, for the purpose of passing a greater tonnage through them at present mill speeds, which I believe, are as a maximum, about 1000 feet per minute for the larger mills, and up to perhaps 1500 feet per minute for the smaller mills.

However, strip mills have been proposed to run at speeds of 3000 feet per minute or more, although I am unable to say if any such have been built to date. It is obvious that there is a limit to the economical width of a strip mill, as the stresses and strains increase rapidly with increase of width, as do also the bearing pressures, and the risks of mechanical failure, and also the product of these mills is usually subdivided in subsequent manufacture, so that increased width is not an advantage per se.

The present inventor believes therefore, that much higher speeds may be looked for in the smaller mills in order to economize in manufacture; it is obvious that the same tonnage can be rolled on a mill 30 inches wide @ 2000 feet per minute, as on a mill 60 inches wide @ 1000 feet per minute, and with a much less investment in the mill itself, and probably with more reliable operation. The shear of the present invention is therefore designed to suit this coming need.

In my issued Patent No. 1,965,523 for Rotary flying shears I have shown a machine having independently operatable multiple shear knives, spaced for illustration, about two feet apart (pitch). In the said application I have also shown means for angularly advancing the shear knives and their carriers between cuts, in order to make cuts of a length intermediate of even multiples of the knife pitch.

In my issued Patent No. 1,849,501 I have shown a still more refined mechanism for controlling such angular advance of the knives between cuts, which enables the machine to cut in set lengths, including a range sub-divisable into small fractions of an inch, plus a desired base length, as 11'-6¼" or 19'-8½" or 27'-4¼".

In my issued Patent No. 1,994,107 I have shown means for synchronizing the circumferential speed of the shear knives with the lineal speed of the bar being cut, in such a manner as to produce practically exact relations between these speeds.

Also, it is common practice in the art, with certain types of rotary flying shears, and for lack of better ways as above indicated, to use a shear having one or more rigid knives, and to produce a wide speed differential between the bar and the knives to vary the lengths cut, either by varying (holding back) the speed of the bar, or (more usually) by varying the speed of the shear knives by the use of elliptic gears or similar mechanism, to produce a "loafing" range of the knives between cuts, while at the same time obtaining some degree of speed equality between the bar and the knives at the instant of cutting.

In this method, if the speed differential is small the length variation of the cut sections is also small, and if, to enable the shear to cut a variety of lengths, the speed differential is large, the apparatus operates with shock and damage to itself, and makes cut edges which are ragged and of inferior quality, to say nothing of the inaccurate lengths of the cut sections.

In the application last above referred to I obviate this difficulty almost entirely at present mill speeds, by providing means (choice of which knife shall cut) which limits the angular adjustment necessary to make "in between" cuts to a small amount, and which provides exact synchronization at the instant of cutting.

However, even in this improved construction there are two limitations as to high speed:

1. The first and lesser one is the inertia of the radially adjustable knives and their connected parts (to cut or not to cut). Subject to this limitation only, shears of medium size can probably be built to cut bars moving at 3000 feet per minute direct from the mill rolls. Such cuts would be in "steps," or multiples of the knife pitch.

2. However when cuts of a length "in between" these steps are required, it is necessary to angularly shift the knife carriers between cuts as before indicated, and as the masses to be moved are in this case greater than that of the knives and attached parts, and the degree of movement is also greater, the inertia forces to be overcome may become several times as large, and this speed limitation is thus more serious.

The avoidance of this difficulty and the attainment of extremely high cutting speeds is the purpose of the present invention. Suppose we had a rotary flying shear comprising two parallel rotary members mounted on fixed centers, geared together, and each provided with a rigid knife which co-acted with the opposite knife.

If this mechanism was used to cut up a bar moving at exactly the peripheral speed of the knives, and passing between them, and making one cut per revolution of the knife carriers, it is probable that the speed of the bar (mill delivery speed) could reach 5000 feet per minute, for thin material (say up to 1/8" thick) without distress to a properly designed shear; or, in other words, it would probably be practical to shear such a bar at such a speed.

When, however, selective knives are used with a radial adjustment of say 1/2" (to cut or not to cut) the speed of the bar which may be cut depends on the facility with which such knives can be so adjusted.

If we assume that there are ten knives on each knife carrier, equally spaced around the circumference thereof and of one foot pitch, then the circumferential travel of the knives would be 10 feet per revolution of their carriers, and at 300 revolutions per minute of the said carriers the shear could cut a bar moving at 3000 feet per minute, into sections varying by steps of one foot, or say as a practical example, into sections of from 10 to 30 feet, varying by one foot.

As there is nearly a whole revolution available for the radial adjustment of the knives, at 300 R. P. M. there would be available for this purpose a little less than 1/5 of a second, which is within the ability of electric magnets or compressed air cylinders to effect, with proper design.

Now, while a large speed differential between the bar and the knives is distinctly bad as previously set forth (I believe such differentials exceeding 100% have been used), a small speed difference at the instant of cutting, under certain conditions (preferably an excess of bar speed over the knife speed, rather than the opposite) might, and probably would, do no practical harm.

I cannot say just what the amount of such a speed differential can be, as this is a problem best solved by empirical data obtained from actual experience with machines of this type. In any case the exact amount or degree, of speed variation permissable, is not a matter of concern to us at this moment, as it is certain that these speeds may be asynchronous to some degree, and to whatever extent good practice may set a limit, that value may be taken advantage of by the method and means included in the following disclosure of my present invention.

I will assume for purposes of illustration only, that with the high bar speeds contemplated by the present invention (2500 to 4000 feet per minute), a speed differential of 10% may be used, or to apply this to our concrete example, with a ten knife shear drum of ten feet circumference, rotating at 300 R. P. M. or at a speed of 3000 feet per minute, the bars may be fed to it and successfully sheared, at lineal bar speeds up to 3300 feet per minute.

The effect of this would be to increase the length of a normal cut made at equal speeds, as follows:

A 10' 0" cut section would become 11' 0" long
A 15' 0" cut section would become 16' 6" long
A 20' 0" cut section would become 22' 0" long
A 25' 0" cut section would become 27' 6" long
A 30' 0" cut section would become 33' 0" long In other words, by combining a number of selectively operatable knives, closely pitched, with facility for closely controlled asynchronous operation of the bar and knives at a speed differential up to 10%, the length of the cut sections can be accurately controlled for "in between" cuts, without any other speed limitation than the time required to radially shift the comparitively light shear knives and attached parts, to cut or not to cut.

In this sense, and for these extreme high speeds, this is an improvement on my previous inventions above referred to. It will now be seen that for any length of cut over 11' 0", a 10% speed differential is more than enough. For instance, it will be seen that a cut having a length of Per cent
15' 11 1/2" would require 15 ft.=180"+11 1/2" or 6.4
20' 11 1/2" would require 20 ft.=240"+11 1/2" or 4.8
25' 11 1/2" would require 25 ft.=300"+11 1/2" or 3.8
29' 11 1/2" would require 29 ft.=348"+11 1/2" or 3.3
29' 1"      would require 29 ft.=348"+1"      or 0.29

It will also be obvious, that with suitable adjustable mechanism to accurately control the asynchronism, it is easy to compute the precise amount of asynchronism required to produce any desired cut length, in units of feet, inches, and inch fractions, so that by such mechanism taken as a whole, any desired lengths may be cut.

The steps required to produce such apparatus are as follows:

1. Determine by experience or tests the degree of asynchronism practically permissable at the desired speed and for the given material.

2. Provide a shear having evenly spaced knives, independently operatable in desired sequences, and whose pitch is less than the length represented by the product of the permissable percentage of asynchronism and the length of the section to be cut.

3. Provide adjustable mechanism for obtaining and maintaining accurately the desired degree of asynchronism to suit the length of cut sections to be produced.

Having now indicated the results to be obtained I will show how to accomplish them.

In the drawings

Fig. 11 is an end elevation of the trunnion for the upper drum, and its valve plate, showing the air ports for the distributing valve.

Fig. 12 is a cross section of the gridiron operating valve and connected parts on line 12—12 of Fig. 11.

In my previous applications I have shown and described electric magnets for the radial adjustment of the knives, and various electrical controlling devices in connection.

Electric magnets have marked advantages and marked disadvantages for such service. Among the disadvantages are 1. The danger of short circuits.
2. Their increased weight, size, and cost over other available mechanism.
3. The time necessary to energize and de-energize them.
4. The fact that apparatus of this kind is almost invariably built by a machine shop, and by using mechanical devices only the maker reduces his purchases of outside material, and keeps his profits at home.
5. Mechanical defects are usually more obvious.

For these reasons, especially the 2nd and 3rd I prefer to make use of air operated devices for adjusting the shear knives, and as far as possible, mechanically operated controls for the said devices.

Figures 1, 2:
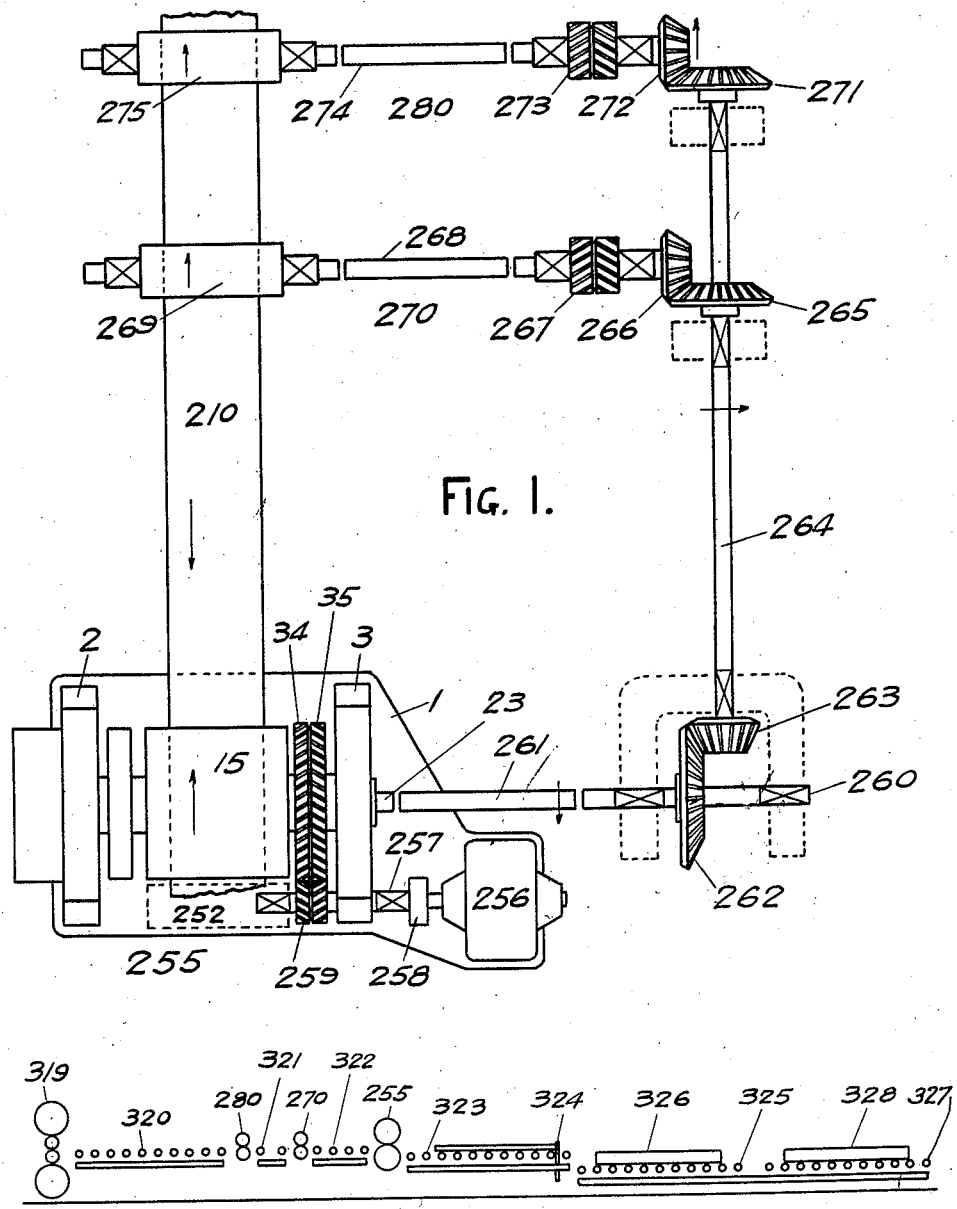
Fig. 1 is a diagrammatic plan view of the shear, the synchronous pinch rolls, the asynchronous pinch rolls, and the connecting drives.
Fig. 2 is a diagrammatic side elevation of a strip mill, a rotary flying shear according to the present invention, an approach table, and piling tables.
Figure 3:
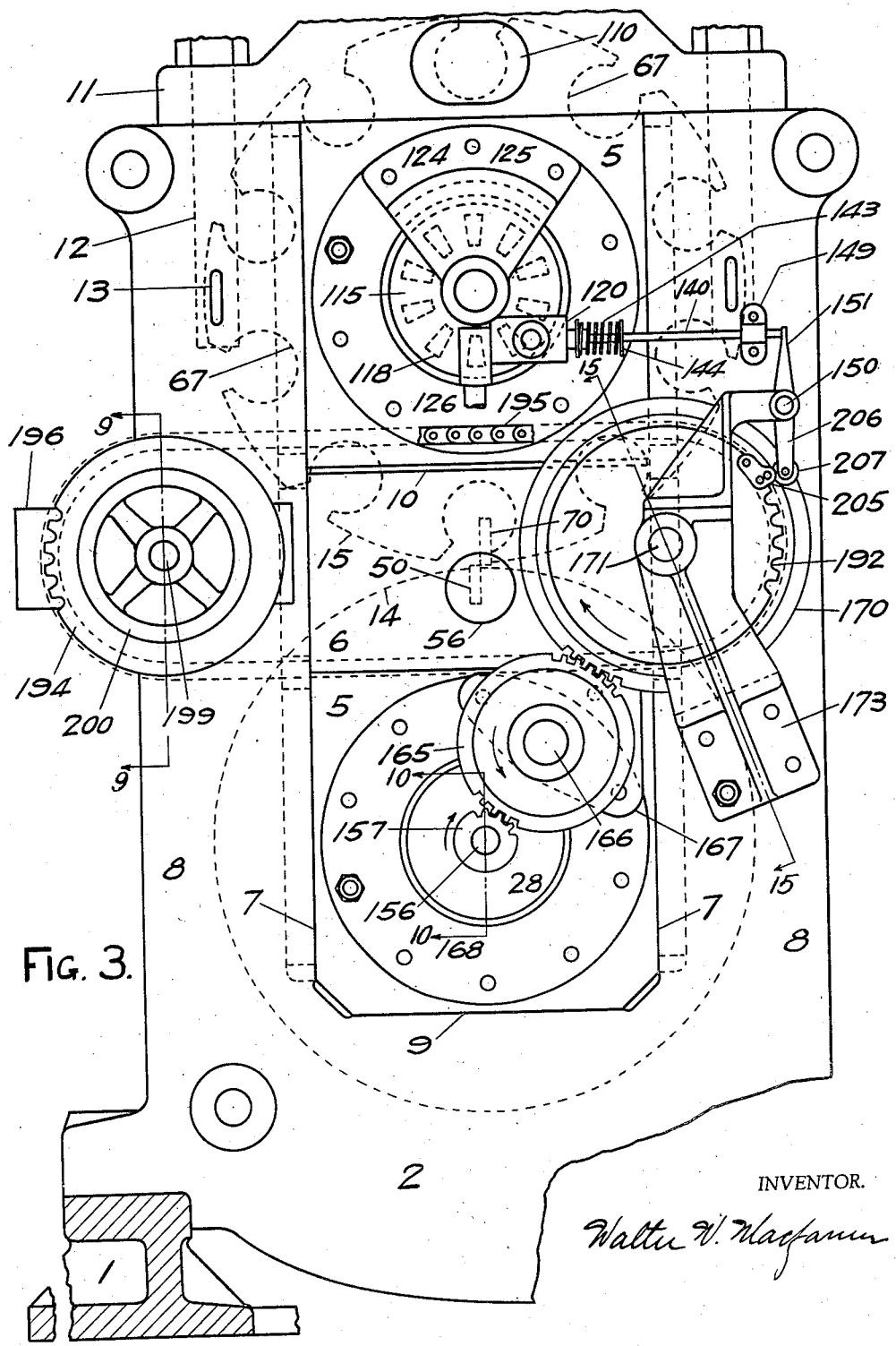
Fig. 3 is an elevation of the operator's end of the shear.
Figure 4:
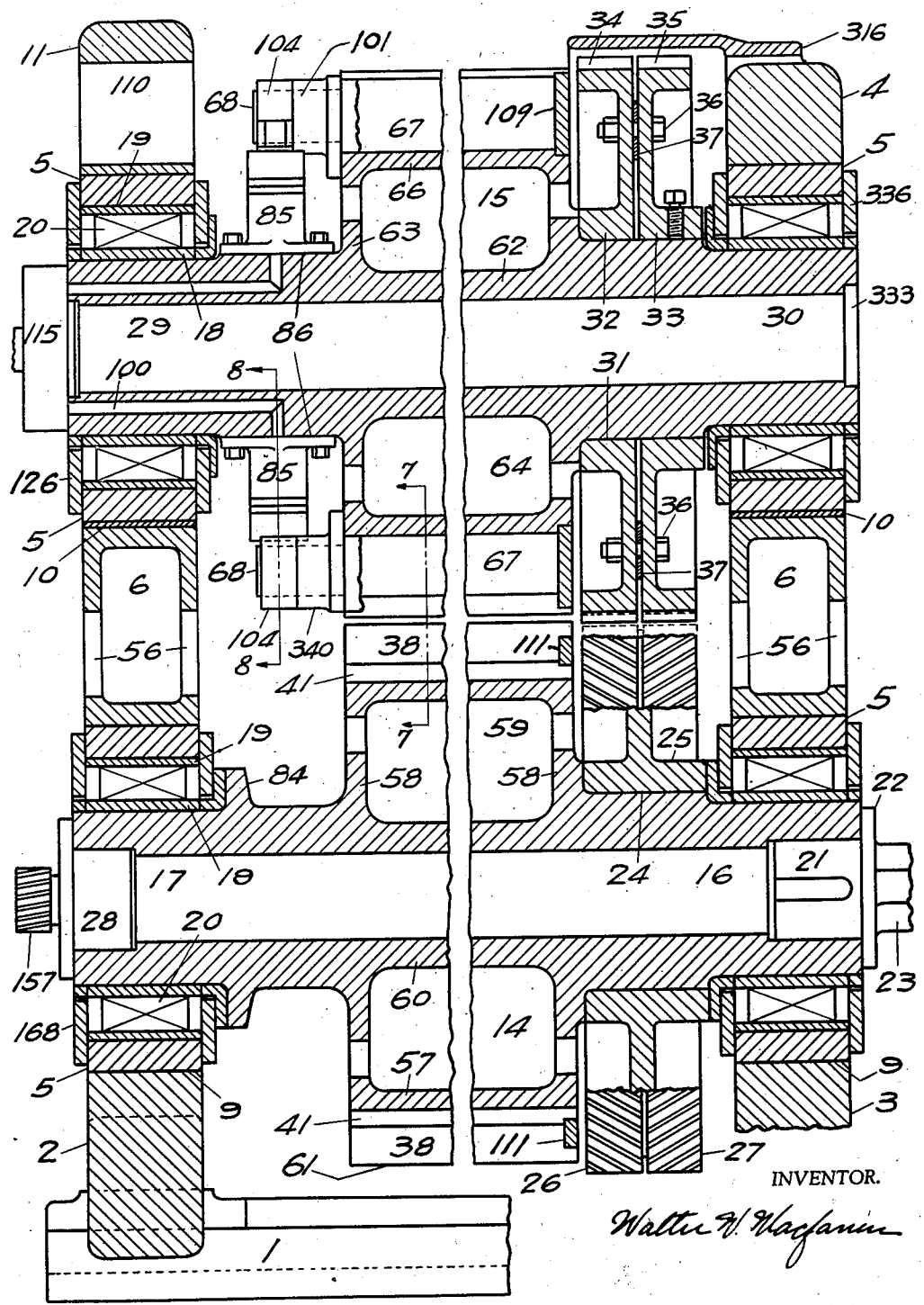
Fig. 4 is a longitudinal vertical section of the shear proper, exclusive of the drive and controls.

The construction of my improved rotary flying shear and its attached parts is as follows:

Referring to Figs. 1, 3, and 4, the bedplate 1 may be set on a suitable foundation, and carries the shear housings 2 and 3. The housings 2 and 3 are provided with upper and lower bearing boxes 5 which may be duplicates of each other. The boxes 5 rest in a window 7 between the side posts 8 of the housings 2 and 3.

The lower boxes 5 rest on surfaces 9, and the upper boxes 5 rest on separators 6. Shims 10 may be placed between the upper boxes 5 and the separators 6 for accurate adjustment.

The tops of the housings 2 and 3 are closed by caps 11 and 4, which may be secured by bolts 12 having cotters 13, all in the usual manner. Mounted in the lower boxes 5 there is a lower knife carrier or drum 14, and similarly, in the upper boxes 5 there is mounted an upper knife carrying drum 15.

The lower drum 14 is provided with hollow trunnions 16 and 17, upon which are mounted the inner races 18 of roller bearings, which also include the outer races 19 and the rollers 20. The trunnion 16 is bored to receive a stub end 21 having a flange 22 which may be secured to the end of the trunnion 16. The member 21 is also provided with a "pod" 23 or other suitable connection for a drive spindle.

The trunnion 16 is enlarged at 24 to form a seat for the drive gear 25, which is a one piece gear having double helical teeth, the teeth on the two sides of the gear being designated 26 and 27, and having preferably a helical angle of about 30 degrees.

The trunnion 17 is also bored to receive a member 28 which will be described later, as will also the knives and slots for the same in the lower drum 14.

The upper drum 15 is provided with trunnions 29 and 30 upon which similar or duplicate roller bearings may be mounted. Unless for unusual reasons the four main roller bearings for the drum trunnions would be duplicates.

The trunnion 30 is enlarged to form a seat 31 for a pair of gears 32 and 33, placed back to back, and bolted together by bolts 36 against the shims 37. The inner gear (half) 32 has helical teeth 34, which mesh with the teeth 26 of gear 25. The outer gear 33 has teeth 35, which mesh with the teeth 27 of gear 25.

If the two gears 32 and 33 have oppositely slanted helical teeth as shown, they are, for driving purposes, the equivalent of the single gear 25, and have the same dimensions as to pitch, number of teeth, face of teeth, and helical angle of teeth, all formed so that the combined gears 32 and 33 mesh with the single gear 25. The reason for splitting the upper gear 32—33 is as follows:

In shears of this type, the cutting knives on the two drums 14 and 15 must be accurately registered, and this is accomplished, first, by mounting the drums in accurate bearings; and second, by connecting the drums by accurate gears. By present practices machine cut gears of minute accuracy as to tooth form and tooth spacing are produced as a commercial product, and in this machine usual commercial accuracy is all that is required, as the gears 32—33 and 25 are of even ratio, with an equal number of teeth; consequently the same teeth are in contact for each cutting position of a pair of coacting knives.

With new gears, the center distance between the drums 14 and 15 can be accurately adjusted by the liners 10, and the "backlash" can be reduced to a minimum. However, as the gear teeth 26, 27, 34, 35 wear, this backlash will increase, and affect the accurate registry of the knives.

However the evil effects of backlash are not so evident except when cutting thin material. If the shear is used to cut hot skelp an inch thick, 1/16" of backlash might have no perceptible ill effect, although of course it would do no good. If however, the shear was used to cut strip steel only 1/16" thick, 1/16" of backlash, or even much less, might destroy the ability of the shear to make clean cuts, as the strip could wedge itself between the coacting knives without being cut at all.

When cutting thick stock the construction shown in Figs. 1 and 4, of double helical gears with the usual opposed helix angles is practicable. In this case the gears can be initially set to reduce the backlash to a minimum, and can subsequently be given a limited adjustment to reduce the increased backlash due to wear, by reducing the thickness of the shims 10, and thus drawing the drums 14 and 15 and their gears closer together. It is however, desirable to have a special adjustment to control the backlash, and one with a greater range of adjustment. This can be done as follows:

With gear teeth 26, 27, 34, and 35 of opposed helix angles as shown in Fig. 4, if the shims 37 are reduced or increased in thickness, the gear teeth 35 may be moved to right or left as the case may be, or in effect the teeth 34 and 35 are brought closer together, or spread farther apart, while the teeth 26 and 27 are unchanged. This action will merely change the angular relation of the drums 14 and 15, as they are free to rotate.

However, if the helix angles of the teeth 26 and 27 are the same with reference to the drum 14, these teeth being in a sense parallel instead of opposed as shown in Fig. 4, then as the teeth 35 are moved along the shaft with reference to the teeth 34, by changing the thickness of the shims 37, and if the drums 14 and 15 are fixed endwise in their bearings; the teeth 34 will tend to hold the teeth 26 against rotation, while the teeth 35 will tend to rotate the teeth 27 in one direction, thus eliminating backlash to any desired degree. This is the object of the construction shown in Fig. 4 for axially adjusting the gear 33 and the teeth 35 by the shims 37 and the bolts 36. In this case there will be end thrust between the drums 14 and 15 which may be provided for in any usual or preferred way. This thrust is to some extent neutralized by the frictional contact of the knives and the stock.

Also, in this case, as the machine runs in one direction only, the meshing teeth 26 and 34, or the meshing teeth 27 and 35 will do the actual driving, the other set of teeth being used to control the backlash. The widths or faces of these two sets of teeth can be proportioned for their respective duties.

Figure 21:
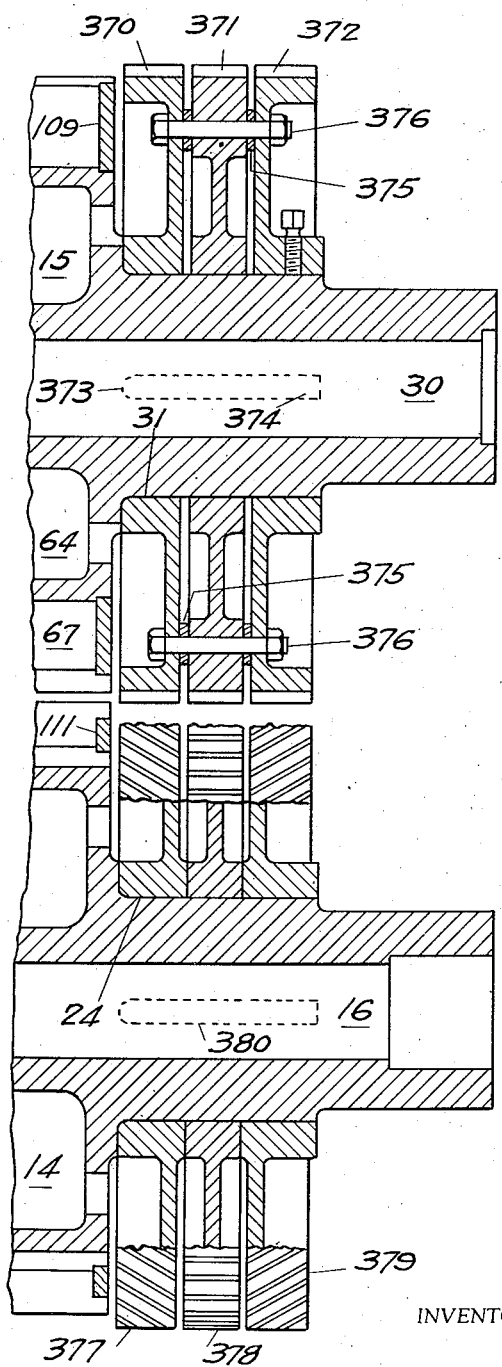
Fig. 21 is a partial longitudinal vertical section of the machine, similar to the right half of Fig. 4, and showing a modified arrangement of drum connecting gears.

The arrangement above described for eliminating backlash is effective for that purpose, but it introduces end thrust in the drum drive which is objectionable. In order to eliminate this end thrust and secure the advantages of the double helical drive shown in Figs. 1 and 4, I show a third arrangement of gears in Fig. 21, consisting of six gears arranged as follows:

On the upper trunnion 30 there are three gears 370, 371, and 372, set side by side. The left gear 370 is a single helical gear loosely mounted on the seat 31 for axial adjustment, and may be practically a duplicate of the gear 32 of Fig. 4. The middle gear 371 is a spur gear (straight teeth) of equal diameter and pitch to the gear 370, and may be a press fit on the seat 31.

The right gear 372 is a single helical gear of the same size as the gear 370, but having teeth of the opposite slope, and may be practically a duplicate of the gear 33 of Fig. 4, and is loosely mounted on the seat 31 for axial adjustment.

All three of the gears 370, 371, and 372, engage the key 374. Between the gears 370 and 371, and between the gears 371 and 372, there are placed a number of shims 375, and bolts 376 pass through the three gears 370, 371, and 372, and the shims 375 to lock them together. On the seat 24 of the trunnion 16 there are placed three similar gears 377, 378, and 379, the helical gear 377 meshing with the helical gear 370; the spur gear 378 meshing with the spur gear 371; and the helical gear 379 meshing with the helical gear 372.

All the gears 377, 378, and 379 may be a press fit on the seat 24, and be engaged by the key 380. The gears 370 and 372 being of opposite hand, form in effect a double helical gear which takes the main driving forces from the similar pair of gears 377 and 379, and the meshing spur gears 371 and 378 serve to control the backlash. When the shims 375 are removed and replaced by thinner shims, the gears 370 and 372 may be drawn closer together by the bolts 376, thus rotating the upper drum 15 an amount sufficient to assure close contact between the teeth of the spur gears 371 and 378.

This arrangement gives all the advantages of the simple double helical drive as shown in Figs. 1 and 4, with the ability to reduce the backlash to any desired amount, and by subsequent adjustments to so maintain it during the entire life of the gears.

I may now state that I prefer to mount the lower drum 14 in its bearings so that it is fixed against endwise motion, and I prefer to mount the upper drum 15 to float endwise a small amount, say ⅛″, its position endwise being determined by the mesh of the helical gear teeth 26, 27, 34, and 35.

I will now describe the mounting of the shear knives in their drums. Since, in order to adjust certain of the knives "to cut, or not to cut," either half or all of the knives must be adjustable. I prefer, for cutting thin material such as strip steel, to make only half the knives so adjustable, to simplify the construction.

This being decided, a further decision is necessary. All the adjustable knives may be placed on one drum, and all the fixed or rigid knives on the other drum, or half of each kind of knives may be placed on each drum.

In prior applications hereinbefore mentioned I have used the latter method, but in the present invention I prefer, for reasons which will appear later, to place all the adjustable knives on the upper drum 15, and all the fixed knives on the lower drum 14.

Figure 7:
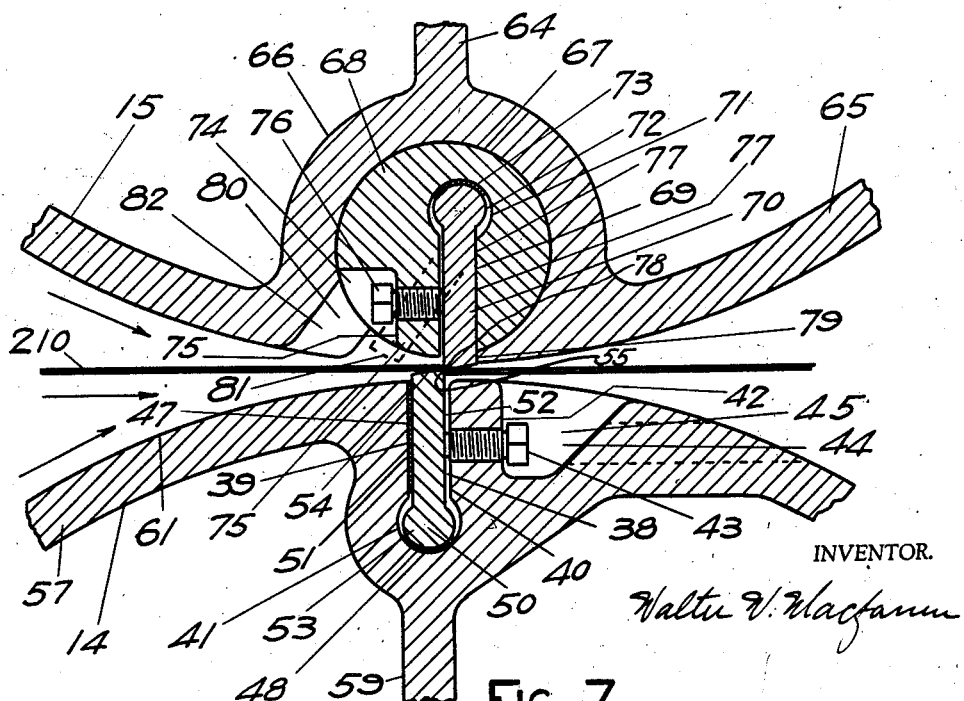
Fig. 7 is a vertical cross section through an upper and lower co-acting shear knife, showing the mounting of the same in the carrying drums, and taken on the line 7—7 of Fig. 4.

Referring to Figs. 4 and 7, the lower drum 14 is provided with a series of evenly spaced slots 38 (in the present discussion there are ten of these) having two parallel sides 39 and 40. Each slot 38 connects with a small bored hole 41 formed in the drum 14 parallel with its axis, the lower portion of which forms a seat for a knife. A rib 42 extends parallel to the slot 38, and set screws 43 are set therein to hold the knife; wrench clearance being provided by the space 44, which may be subdivided by ribs 45.

Flat shims 47 are provided for lining the knives horizontally (as shown in Fig. 7), and curved shims 48 are provided for setting the knives to correct radial position.

The knives 50 have parallel sides 51 and 52, a lower oval shaped portion 53, a curved upper face 54, and a single cutting edge 55. These are the rigid knives, being held in operative position by the set screws 43, and adjusted for position by the shims 47 and 48.

The oval portion 53 is wider than the slot 38, so that if the set screws 43 work loose, the knife 50 cannot be thrown out of the slot 38 by centrifugal force. In placing and removing these knives in and from their slots, they are moved endwise, a cored opening 56 being formed in one of the separators 6 for this purpose. (See Figs. 3 and 4.)

The lower drum 14 has a continuous outer "barrel" 57 connected by the end pieces 58 and the ribs 59 with the central barrel or shaft 60, thus making a very rigid member. The outer surface 61 may be turned to size.

The upper drum 15 is of similar construction, having an inner barrel 62, end members 63, ribs 64, and an outer barrel 65. In the drum 15 there are formed small barrels 66 in which are formed bored holes 67, in each of which is mounted an oscillating knife holder 68, having a slot 69, in which is placed an upper oscillating knife 70.

The slot 69 joins a small bore 71, formed to receive the oval edge 72 of the knife 70, and the shims 73. The upper knives 70 may be the same in all dimensions as the lower knives 50, except as to their width (vertical in Fig. 7) which is greater. As the knives 70 are worn and ground down, they become too narrow for use in the knife holder 68, and can then be used as lower knives 50.

A groove 74 is formed in the knife holder 68, leaving a rib 75 between it and the slot 69, and set screws 76 are placed in the rib 75 to hold the knives 70.

The curved shim 73 adjusts the knife 70 in a radial direction, and no other shims are necessary, as the knife 70 is always tightened against the surface 77 of the slot 69, and the co-acting lower knife 50 is set by shims 47, so that the cutting edge 55 of the lower knife 50, is in proper relation to the cutting edge 78 of the upper knife 70, when the said upper knife 70 is pressed against the lip 79 of the drum 15.

A second lip 80 is formed in the drum 15, there being an open space between the lips 79 and 80, so as to clear the oscillating swing of the knife 70, which moves from the cutting position against the lip 79, to the normal inoperative position as indicated in dotted lines at 81. Wrench clearance for the set screws 76 is furnished by appropriate notches 82.

It will be observed that the cutting edge 78 of the knife 70 is located on the center line of the bore 67, and as the cutting pressure on the knife 70 is always to the right of the cutting edge 78, the tendency of the cutting pressure is to force the knife 70 closely against the lip 79, thus giving extreme rigidity to the knife at the instant of cutting, and also assuring alignment of the knife 70, as there is practically no wear on the lip 79.

It will be understood that the knife holders 68 and the bores 67 are accurately machined and smoothed to an easy working fit, so that the knife holders may be quickly oscillated when desired. It will also be noted, that due to the small diameter of the knife holder 68, and to its oscillating motions, its inertia is low.

It will also be noted that the above described adjustment of the oscillating knives, to cut or not to cut, is to all effects and purposes a "radial" adjustment, although the path of the knife is not strictly on a radius of the drum, its cutting edge is withdrawn to a lesser radius, and so cannot engage the material to be cut. The side shift of the cutting edge has no material effect, it being used merely as a matter of mechanical convenience.

Attention is also called to the fact that the drums 14 and 15 are simple in form, and comparitively easy to produce as steel castings, and that the machining operations required are simple and of ordinary character, such as may be performed in any well equipped machine shop. This also applies to the knife holders 68, which are preferably made of rolled or forged steel. It will be understood that all the knife holders 68 are duplicates, as are also the bores 67, the knives 50, the knives 70, the slots 38, and the slots 69.

As before stated, for a very high speed machine such as I am describing, I prefer to operate the knife adjustment "to cut or not to cut" by purely mechanical means such as compressed air cylinders.

Figure 8:
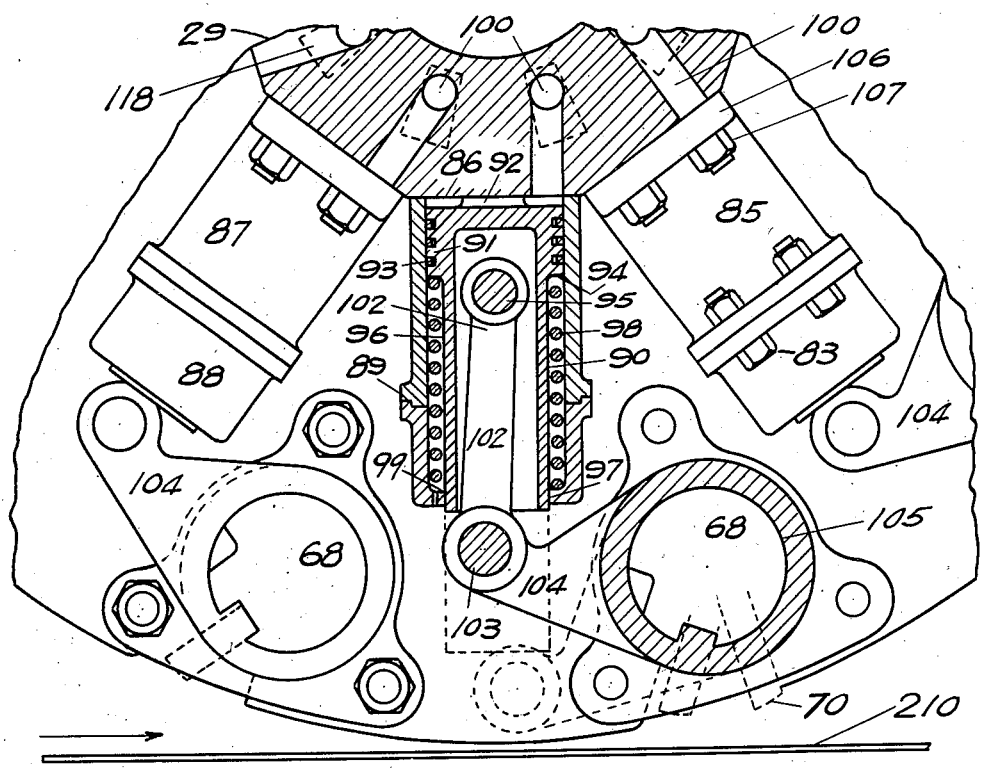
Fig. 8 is a vertical cross section through one of the knife oscillating air cylinders and connected parts, on the line 8—8 of Fig. 4.

In Fig. 4 I have shown the cylinders 85 mounted on flat seats 86 formed on the trunnion 29, and in Fig. 8 I have shown one of the air cylinders 85 in section, and its relation to adjacent cylinders. All the cylinders 85 are duplicates.

Each cylinder 85 is formed in two parts, a base section 87, and a cover section 88. These two sections are joined by flanges 89, and bolts 83.

A piston 90 works in the cylinder 85, and is provided with a pressure end 91 having a boss 92 which abuts on the surface 86; a set of spring rings 93, a shoulder 94, a wrist pin 95, and an extension or guiding portion 96 which works in the bore 97. The piston 90 is preferably hollow as shown.

A coiled spring 98 surrounds the guide portion 96, and is confined endwise between the shoulder 94 and the inner surface 99 of the cylinder section 88. Compressed air to operate the piston 90 is supplied through an air port 100 drilled in the trunnion 29. It will be understood that the air pressure in cylinder 85 positions its corresponding knife 70 to cut, as shown in Fig. 7, and that the spring 98 normally holds the knife 70 in the radially inner, or non-cutting position. Thus, on the failure of the air pressure no cuts will be made.

In this connection it may be noted that centrifugal force has no effect on the position of the knife holders 68, and no effect on their operation except to produce a little friction against their oscillation. They may, of course, be lubricated.

The wrist pin 95 operates a connecting rod 102, which is connected to a pin 103 mounted in the end of a lever 104, the said lever having a non-circular opening fitting over the end 105 of the knife holder 68 to oscillate the same. (See Fig. 8.) The air cylinder 85 is secured to the seat 86 by lugs 106 on the base section 87, and bolts 107. Thin copper base gaskets may be used.

It will be observed from Fig. 8 that the air cylinders 85 are spaced on radial lines bisecting the angle between two of the oscillating knife holders 68.

As shown in Figs. 3 and 4, the housing 3 is provided with a cap 4 secured by bolts 12. The housing 2 is provided with a similar cap 11, secured by similar bolts 12, and also provided with a cored opening 110, through which the upper knives 70 may be successively removed and replaced by rotation of the drum 15. The opening 110 also serves to withdraw and insert the oscillating knife holders 68, when necessary for inspection and lubrication. With a simple grinding attachment all the knives may be ground in place.

It will also be apparent that the knives 70 may be changed when dull by removing the knife holders 68 with their contained knives 70, and substituting other knives on the bench; in fact if this practice is followed time is saved.

Figures 5, 6:
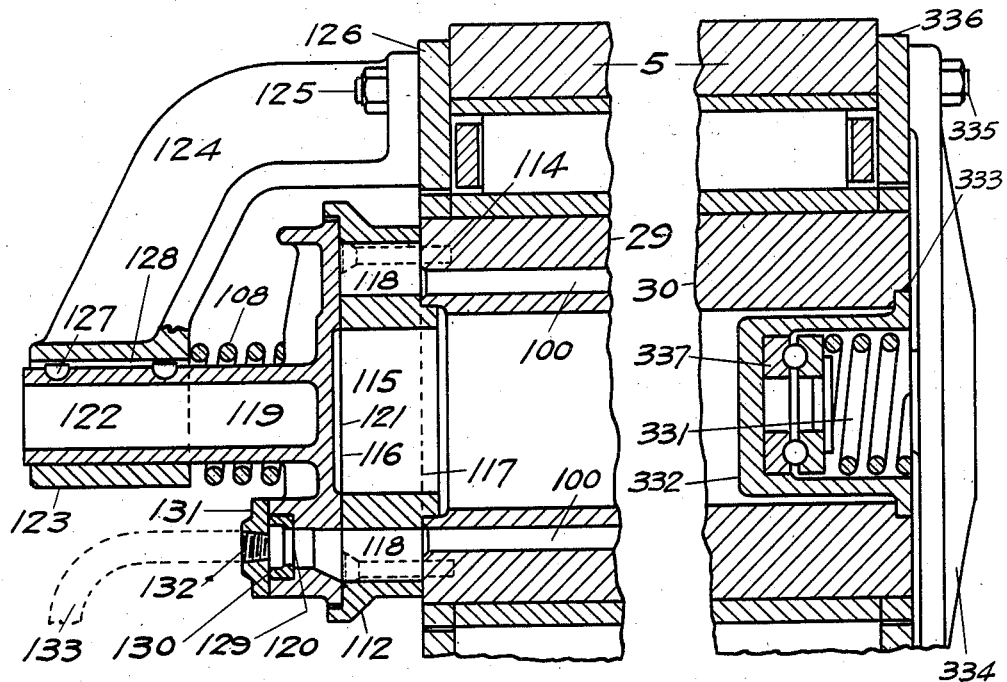
Fig. 5 is a vertical cross section of trunnion 29 and connected parts.
Fig. 6 is a similar view of trunnion 30 and connected parts.

To supply compressed air to operate the air cylinders 85, I provide a rotary ported distributing valve 115 as shown in Figs. 3, 4, 11, and 12, and a reciprocating "gridiron" air supply valve 120 for timing the admission of the compressed air to the distributing valve 115, as shown in Figs. 3, 5, and 12.

Referring to Figs. 11 and 12, the valve 115 consists of a "port box" or rotating member 112;

which is centered by a counterbore 113 in the end of the trunnion 29, and is bolted thereto by bolts 114. (See Fig. 5.)

The member 112 has a flat face 117 which makes an air tight joint against the flat end of trunnion 29, and a flat working face or seat 116. Between the two faces 116 and 117 there is formed in the member 112, a series of radially disposed evenly spaced air ports 118, one for each air cylinder 85. The ports 118 may be made of greater volume by increasing the size of the member 112 in diameter or length.

At the face 117 the ports 118 connect with the drilled ports 100 in the trunnion 29, which supply the cylinders 85. As shown in Fig. 5, the valve seat 116 is covered by a distributor plate 119 having a flat surface or seat 121, which bears against the face 116 of the member 112, and covers all the ports 118. The plate 119 is pressed against the seat 116 by a spring 108.

The member 119 has an integral cylindrical stem 122, which slides freely in a close fitting guide 123, formed in a bracket 124 secured by bolts 125 to the cover plate 126 of the bearing box 5. Keys 127, secured to member 119, prevent rotation thereof by engaging the keyway 128 in the bracket 124. It is obvious that the angular position of keyway 128 and keys 127 is so chosen as to obtain the proper registry of the valve ports 118 with the supply and exhaust ports 134 and 152 in member 119.

The housing for the supply valve 120 may be formed integral with the member 119, and provided with a grooved seat 129 on which the gridiron supply valve 130 operates. A cover 131 is provided with a tapped opening 132 for a flexible air conductor 133 to supply compressed air.

The valve 120 is provided with a twisted port 134, its outer end connecting with the series of small ports 135 beneath the valve 130, which has matching ports 136 extending through it. The inner of the port 134, where it meets the valve seat 116, is the shape of the radial ports 118, and matches with them.

The valve 130 is operated by a rod 140, which passes through a stuffing box 141 having the adjustable gland 142, and is held normally in the closed position as shown in Fig. 12 by a coiled spring 143 acting against the washer 144. The end motion of valve 130 is limited by the end 146 striking the surface 147.

The outer end of the rod 140 is engaged by a guide 149, and its end may be engaged by a lever 151 carried by a rock shaft 150. From the foregoing it will be apparent that by the intermittent operation of the lever 151 the gridiron air supply valve will admit air to one of the ports 118, and that this air will pass through one of the ports 100 to one of the air cylinders 85, to position one of the oscillating knives 70 to cut when it next meets its co-acting rigid knife 50.

This quantity of compressed air will be supplied when one of the rotating ports 118 is at the position "A" in Fig. 11, and will, when the port 118 rotates out of line with port 134, be bottled up in the ports 118 and 100, and the cylinder 85.

Due to the high speed of rotation of the drums 14 and 15, it is probable that no adjustment of the oscillating knife holder 68 will take place until the ports 118 and 134 are out of register, so that all the work of moving the piston 90 will be done by the expansion of the contained air.

At the assumed speed of the drum 15, viz. 300 R. P. M., the time available for the full oscillation of the knife holder 68 will be a little less than ⅕ of a second. The required air pressure will depend on the friction and inertia of the knife holder 68 and its connected parts, and the required unit air pressure will also be a function of the diameter of the cylinder 85. In addition, it must be taken into account that the air works expansively, and must, at the outer end of the piston stroke (90), have sufficient available force to hold the knife 70 closely against the lip 79, and against the pressure of the spring 98; and in addition an excess amount of air must be supplied to compensate for leakage past the rotary distributing valve 115, and the piston rings 93 of cylinder 85.

In other words, a sufficient amount of compressed air must be "rammed in" to accomplish these results with certainty. With ten ports 118 as shown in Fig. 11, having a maximum width at their outer ends of 1¼", and operating against a similar port 134 of equal dimension, the air would flow during 2½" of travel of the outer port circumference which is, as shown, about 33".

The ports 118 and 134 would be partially open or connected for $$\frac{2.5}{33}$$

or .0757 revolution, or about 27 degrees. At 0.2 second per revolution (300 R. P. M.) the time of partial opening would be 0.2×.0757, or 0.1514 second, to pass compressed air at say, 100 to 150 pounds pressure.

As a fluid speed comparison, the gas is drawn by suction (2 to 3 lbs. vacuum) into the cylinder of an automobile motor @ 3000 R. P. M. at the rate of a cylinder charge (one whole stroke) in ⅙₀₀₀ minute or 1/100 second. So the above design allows 50% more time to move a smaller amount of air at a pressure about fifty times as great.

I now come to the consideration of the necessary timing of the air supply to the cylinders 85 in order to make the desired cuts, and I will first discuss this for an exact synchronous relation between the linear travel of the bar to be cut and the peripheral travel of the shear knives.

It is obvious that with the apparatus so far described to make 10 ft. cuts, it will be necessary to cause each 10th knife to cut, and to cut 30 ft. sections it will be necessary to have each 30th knife make a cut.

In addition to this it will be desirable to cut a short and predetermined "crop end" off the front end of each bar.

Figure 10:
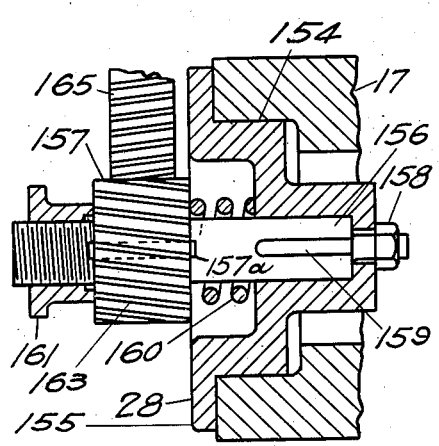
Fig. 10 is a cross section through one end of a lower drum trunnion on line 10—10 of Fig. 3.
Figure 15:
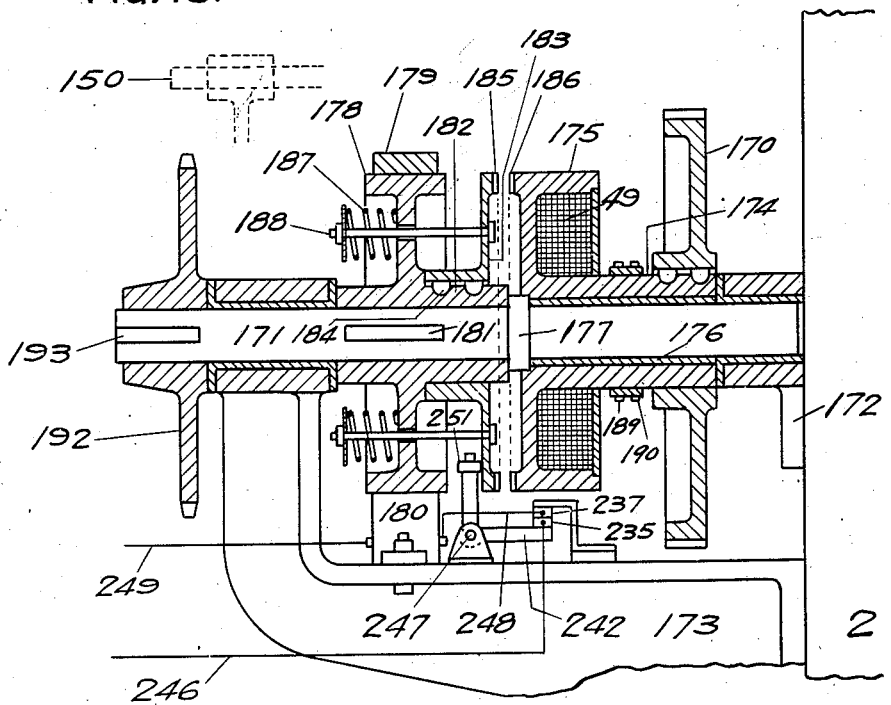
Fig. 15 is a sectional elevation showing the clutch and brake mechanism for the control chains, on the line 15—15 of Fig. 3.

To these ends, I have shown in Figs. 3, 10, and 15, certain mechanism, as follows:

The trunnion 17 has a counterbore 154, to receive a shell 28, having a flange 155 which may be secured to the end of the trunnion. The shell 28 supports a short shaft 156, secured by a key 159 and a nut 158. The shaft 156 carries a helical drive pinion 157 mounted on a feather key 157a, and a coiled spring 160 bears against it as shown. The outer end of the shaft 156 is threaded, and carries a nut 161 which may be used to adjust the pinion 153 along the shaft 156.

The slope of the pinion teeth 163 is such that the thrust is taken against the nut 161. The pinion 157 drives the mechanism which operates the supply valve 120, and by adjusting the pinion 157 longitudinally on the shaft 156, a fine angular adjustment is obtained for the control chain 195 which operates the supply valve 120.

The pinion 157 rotates in the direction indicated in Fig. 3, and drives an idler gear 165 mounted on a fixed pin 166, which may have a flange 167 bolted to the cover plate 168 of bearing box 5. The gear 165 meshes with and drives a helical gear 170 mounted indirectly on a shaft 171, which is supported at one end in a bearing bracket 172, which is bolted to the side of the housing 2, and the other end of which is supported in a second bearing bracket 173 also bolted to the housing 2.

The gear 170 is mounted on the extended hub 174 of a magnetic clutch 175, which has a bushing 176 running loosely on the shaft 171. The shaft 171 has an integral collar 177 which confines the clutch 175 against end motion.

The shaft 171 also carries a brake drum 178 which is engaged by a brake shoe 179, which may be operated by a solenoid magnet 180, against the pressure of a spring 169.

The brake drum 178 is pressed on the shaft 171 and held by a key 181. The hub 182 of the brake drum 178 carries a light jaw clutch member 183 which slides freely on a feather key 184, and is provided with fifty small clutch teeth 185. The teeth 185 match and mesh with fifty corresponding teeth 186 on the magnetic clutch 175, and the clutch 175 is adapted to draw the clutch member 183 magnetically toward it to engage the teeth 185 with the teeth 186, and against the pressure of the small coil springs 187, acting through the bolts 188.

Figure 9:
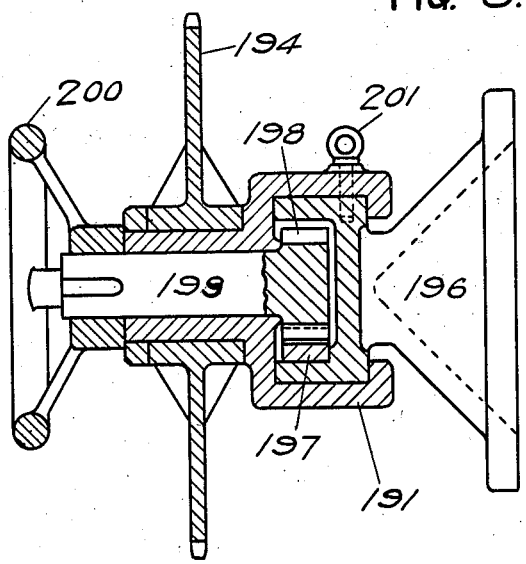
Fig. 9 is a cross section of the take-up for the control chains, taken on line 9—9 of Fig. 3.

Contact rings 189 and 190 are furnished to supply current to the magnet coil 49. On the outer end of the shaft 171 there is mounted a fifty tooth sprocket 192, keyed to the shaft 171 by a key 193. A similar fifty tooth sprocket 194 is loosely mounted on a take-up member 191 (see Fig. 9), which, in turn, is mounted to slide on a bracket 196 which is bolted to the housing 2. The required adjustment is about 12", which will appear later. A rack 197 is fastened to bracket 196, and engaged by a pinion 198, which may be formed integral with the shaft 199 which is mounted in the member 191, and operated by a hand wheel 200 secured to the outer end of the shaft 199.

A latch pin 201 locks the member 191 in certain selected positions as will appear later.

Around the sprockets 192 and 194 there is placed a "control chain" 195. These chains 195 are changeable, and one is required for each "base" length of sections cut. For synchronous cutting of sections 10 ft. to 30 ft. inclusive, there would be a control chain 195 for each length, as for instance 10—11—12 . . . 28—29—30 ft.

The control chains 195, for this discussion, may be taken as of one inch pitch, with all "offset" links (see Figs. 18 and 19) so that a chain may be put together in any length of even inches.

The ratio between the gears 157 and 170 is one to five, so with the drums 14 and 15 rotating at 300 R. P. M., the shaft 171 and sprocket 192 rotate at 60 R. P. M.

Since with ten knives per drum, at 300 R. P. M. there are 3000 knives passing a given point per minute, and similarly with the fifty tooth sprocket 192 rotating at 60 R. P. M. there are 3000 sprocket teeth, or 3000 chain links passing a given point per minute.

There is thus a link of the chain 195, moving its length per one inch, for each knife of the drum 15 moving one foot. Thus each link of the chain 195 may be in synchronous relation with some one of the oscillating knife holders 68.

Figure 16:
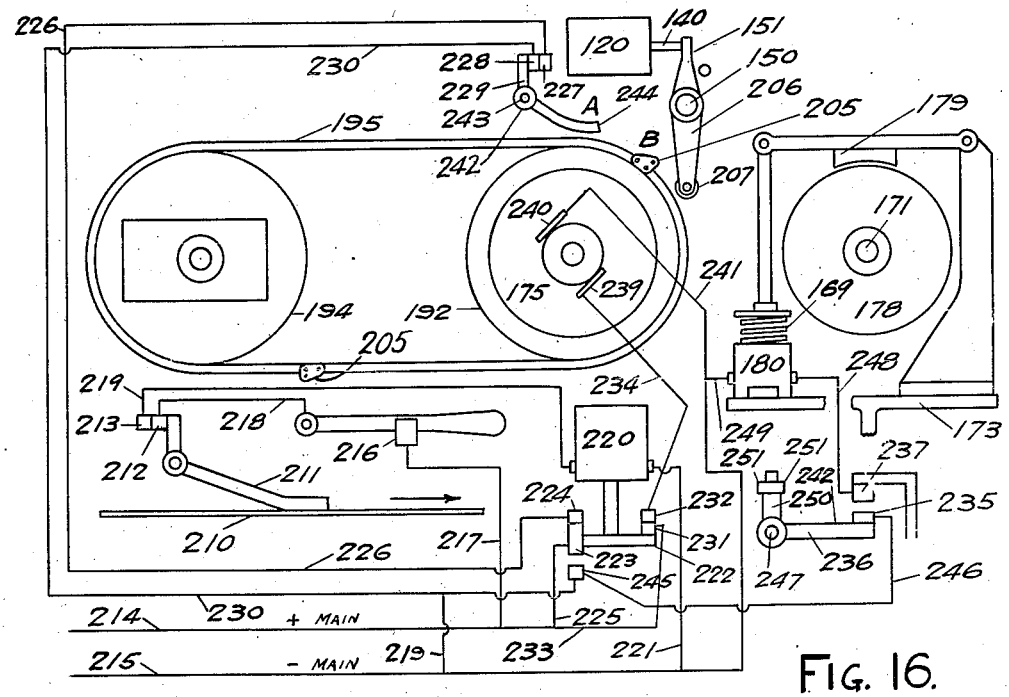
Fig. 16 is a diagram of the control elements.

Referring now to Figs. 3 and 16, the chain 195 carries a number of projections 205. The rock shaft 150 carries a lever 206 which may be supplied with a roller 207, for engagement with the projections 205.

With other conditions correct, each time the rod 140 is depressed one of the cylinders 85 is supplied with a charge of compressed air, and each time a projection 205 passes the roller 207, the rod 140 is so depressed.

Therefore, if every 10th link of the chain 195 carries a projection 205 the machine will cut 10 ft. sections, using every 10th knife, and similarly for other lengths of cuts. We may assume that a control chain 195 to cut 10 ft. sections, is composed of 11 sections of 10 links each, with every 10th link carrying a projection 205, which is 110".

Then other convenient lengths of control chains 195 are as follows for cuts 11 ft. to 30 ft. in length:

| | | |
|---|---|---|
| 10×11=110" | 9×12=108" | 9×13=117" |
| 8×14=112" | 8×15=120" | 7×16=112" |
| 7×17=119" | 6×18=108" | 6×19=114" |
| 6×20=120" | 5×21=105" | 5×22=110" |
| 5×23=115" | 5×24=120" | 4×25=100" |
| 4×26=104" | 4×27=108" | 4×28=112" |
| 4×29=116" | 4×30=120" | |

It will thus be seen that the lengths of the control chains 195 required to make all base length cuts from 10 ft. to 30 ft. inclusive, and varying by one foot, vary only from 100" to 120" in length, and can be accommodated on the sprockets 192 and 194 with an adjustment of the slide member 191 of about 12".

Referring now to Fig. 16, when the front end of the bar 210 to be cut, reaches the adjustable "flag" 211, it engages the same and swings the movable contact 212 against the stationary contact 213, thus allowing current to flow from the positive main 214 via the closed knife switch 216 and the wires 217, 218, and 219, to the magnetic switch 220, and thence through the wire 221 to the negative main 215.

When the switch 220 is energized it raises the arm 222 and carries the contact 223 into contact with the contact 224, thus allowing current to flow from main 214 through wires 225 and 226 to contact 227, and through contact 228 on the hinged arm 229, through wire 230 to wire 219, thus establishing a "hold-on" circuit for the magnetic switch 220.

As the arm 222 is raised, it also carries the contact 231 to meet the contact 232, and thus allows current to flow through the wires 233 and 234 to the brush 239 supplying the magnetic clutch 175; after passing through the clutch magnet this circuit is completed by brush 240 and wire 241 leading to the negative main 215.

When the magnetic switch 220 is de-energized, the arm 222 falls by gravity, and the contact 223 engages the contact 245 from whence a wire 246 leads to a contact 235 mounted on one arm 236 of a small bell crank 242, pivoted by a pin 247 (indirectly) to the bearing bracket 173. (See Fig. 15.)

The contact 235 may swing into engagement with a contact 237 also supported by the bracket 173, and a wire 248 connects the contact 237 with the terminal of the brake magnet 180. This circuit is then completed by the wire 249 leading to the negative main 215.

A vertical arm 250, secured to the arm 236 carries a small roller 251, which engages the rear side of the shiftable clutch member 183. The movable contact 235 is therefore operated by the shifting of this clutch member.

When the magnetic clutch 175 is de-energized, and until the clutch teeth 185 and 186 have been fully disengaged, no current can flow through the brake circuit just described. This arrangement is made to prevent the prior engagement of the brake magnet 180, which might prevent the proper disengagement of the clutch teeth 185 and 186.

The contact 228 is carried by one arm of a small bell crank which is pivoted by a fixed pin 243 over the control chain 195. The arm 244 of the bell crank 242 is arranged to be engaged successively by the chain projections 205 as they pass under it, each projection 205 breaking the hold-on circuit for the magnetic switch 220, but this action does not release the clutch 175 as long as the main circuit to the magnet 220 by the engagement of the flag 211 with the bar 210, is closed.

When, however, the rear end of the bar 210 passes by and releases the flag 211, then the main circuit to the magnet 220 is broken, and the clutch 175 is then under the control of the hold-on circuit through contacts 227 and 228.

It is necessary, in order to limit the length of the front crop end, that the magnetic clutch 175 be released after the passage through the shear of each rolled bar, and this release is effected by the action of the arm 244.

After the flag controlled circuit is broken, the next projection 205 of the chain 195, breaks the hold-on circuit by separating the contacts 227 and 228.

This action occurs approximately at position A in Fig. 16, and the brake shoe 179 being then applied, the sprockets 192 and 194, and the chain 195 are brought to rest, with the projection 205 which caused this action, approximately at the position B in Fig. 16. The distance from A to B represents in movement, of the projection 205, the time required by the brake 179 to bring the affected parts to rest.

It will now be noted that the end of each cutting cycle (each rolled bar cut up) is thus definitely terminated with one of the projections 205 of the chain 195, at position "B," in which position it is ready to quickly start a new cutting cycle by operating the lever 206, which controls the action of the air supply valve 120.

The distance from position B of Fig. 16 to the point where the projection 205 operates the lever 206, is quite definite for any given setting of the brake, since the speed of the chain 195 is constant for any cut section length.

This distance may be assumed as about two pitch lengths of the chain 195, or equivalent to the movement of two of the knives 70 past a given point, or in other words, as two feet of travel of the bar 210.

Assuming now, that we desire a front crop end one foot long, and remembering that the selected knife cuts about 9' 0" or nearly a full revolution after its corresponding air cylinder 85 is supplied with compressed air, the adjustable flag 211 can be set 9+2−1=10 ft. from the vertical center line of the shear (cutting position) and the said one foot (approximate) crop end will be cut.

After which the control chain 195 will produce the repetitive cutting cycle of equal length sections for which it is designed, until the oncoming bar or strip is completely subdivided. It will be noted that any pair of co-acting knives 50 and 70 may start a cutting cycle.

It will be also apparent that two or more lengths of cut sections (accurate predetermined lengths) may be cut at the same time, from the same bar 210, by spacing the projections 205 unevenly on the control chain 195, as for instance, three sections of 25 links, and three sections of 15 links, to cut 25 ft. and 15 ft. lengths. This may be of advantage to the mill in case the customer desires mixed shipments of two or more lengths.

It is thus evident that the simple device of a control chain 195, having spaced projections 205, and driven in a fixed ratio to the rotative speed of the knife carriers 14 and 15 for all lengths of cut sections, not only controls the lengths of the said sections, but also the length of the front crop end (its approximate length).

Referring now to Fig. 1, which shows a diagrammatic plan view of the shear, a pair of synchronous pinch rolls, a pair of asynchronous pinch rolls, and the drives for all of this mechanism, the shear, designated as a whole by the numeral 255, sets on the base plate 1, which may be extended to also support the motor 256.

The motor 256 is preferably a direct current shunt wound motor running about 1200 R. P. M. and supplied with special speed and torque controls as described in my Patent 1,994,107, for Synchronizing mechanism for rotary flying shears.

The motor 256 drives a short shaft 257 supported in suitable bearings on the bed plate 1, through a coupling 258 (preferably a flexible coupling). The shaft 257 carries a double helical drive pinion 259 rigidly keyed thereto, which meshes with and drives the main gear 25, on the lower trunnion 16 of the lower drum 14.

As before mentioned, the drum 14 is fixed against endwise motion, the drum 15 is allowed to float endwise in its bearings, a small amount, and the shaft 257 is also preferably mounted to permit of a small endwise floating action.

A short shaft 260, mounted in suitable bearings, is connected to and driven by the member 23 from the trunnion 16, through a suitable spindle 261.

The shaft 260 carries a bevel gear 262, which meshes with a bevel gear 263 on the shaft 264. The shaft 264 carries a bevel gear 265 which meshes with a bevel gear 266 on a pinion 267, similar to a rolling mill drive pinion.

There may be either two or three pinions 267, forming either a "2 high" or a "3 high" pinion stand, and in either case the bevel gear 266 is preferably mounted on the bottom one of the set.

The upper two pinions 267 of the set, if there are 3 pinions, or both of the pinions 267 if there are two, drive spindles 268 of which there are two, and each of the spindles 268 drives a pinch roll 269, of which there are two, one above the other.

The pinch rolls 269 and their driving members, may be designated as a whole by the numeral 270, and are the "synchronous pinch rolls," or those for synchronous operation of the shear knives 50 and 70 (as to peripheral speed) with the bar or strip 210 (as to lineal speed).

Since the cutting periphery of the knives is here assumed to be ten feet, or 120 inches, it is only necessary to make the pinch rolls 269 one third of this or of 40" periphery, and gear them to the knife drums 14 and 15 in the ratio of three to one, as shown. In other words, if the pinch rolls 269 have a periphery one third that of the drums 14 and 15, they will have to rotate three times as fast to have an equal peripheral speed.

A second set of pinch rolls, designated as a whole by the numeral 280 may be in all respects similar to the pinch rolls 270 except as to the diameter of the rolls 275, and may be driven by duplicate gears 271 and 272, pinions 273, and spindles 274.

These are the asynchronous pinch rolls, and are changeable as to the rolls 275 for each accurate cut length required between the "base" lengths in even feet, or rather one pair of asynchronous rolls 275 will produce a number of cut section lengths. For instance rolls 275 to cut lengths of 10' 1" will also produce lengths of 15' 1½", 20' 2'", 25' 2½", 30' 3", 40' 4", 50' 5", 60' 6", 70' 7", 80' 8", etc.

It will now be obvious that since either the rolls 269 or 275 may be changed for others, a single stand of pinch rolls 270 or 280 might be employed for both synchronous and asynchronous operation, but I prefer to employ two sets of pinch rolls, one for synchronous operation which is always in place and ready to operate, and one for asynchronous operation which may be used only when asynchronous operation is required.

In order to operate the mill continuously, the stand 280 of asynchronous pinch rolls may be picked up bodily and the rolls 275 changed for others, while the synchronous rolls 270 are employed to cut stock, or over size lengths in even feet.

If only one stand of pinch rolls, as 270, is used, only "2 high" pinions 267 will be needed, as the shaft 264 can be slanted vertically to make up the required difference in level between one pinion 267 and the shaft 260.

If, however, two stands of pinch rolls are used as shown at 270 and 280, then "3 high" pinion stands may be preferred, as by their use the shaft 264 may be kept level, or nearly so.

Figures 13, 14:
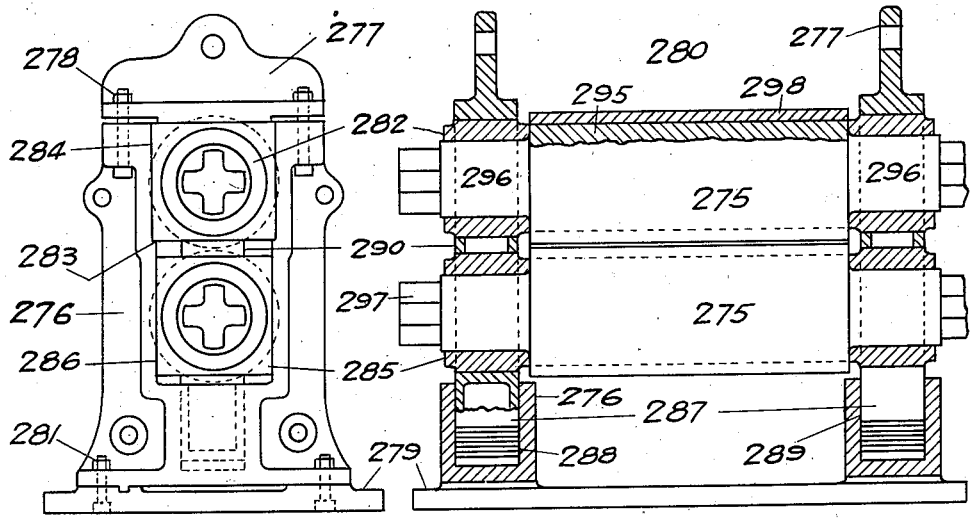
Fig. 13 is an end elevation of a stand of pinch rolls.
Fig. 14 is a sectional side elevation of the same.

While pinch rolls of ordinary design may be used for stands 270 and 280, a special design illustrated in Figs. 13 and 14 has certain advantages.

The rolls 275 (or 269) may be mounted in open top housings 276 having caps 277, secured by bolts 278; the said housings 276 resting on a bed plate 279, and being secured thereto by bolts 281.

The upper of the two rolls 275 is supported in bearing boxes 282 which rest on steps 283 formed in the housing window 284, and are clamped in place by the caps 277.

The lower of the two rolls 275 is mounted in bearing boxes 285, which slide freely and are vertically movable in the lower window 286, and are each supported by a hollow piston 287 provided with spring rings 288, and operating in a cylindrical bore 289 formed in the lower portion of the housing 276. Liners 290 may be placed between the bearing boxes 282 and 285 to limit the "bite" of the pinch rolls 275.

Figure 17:
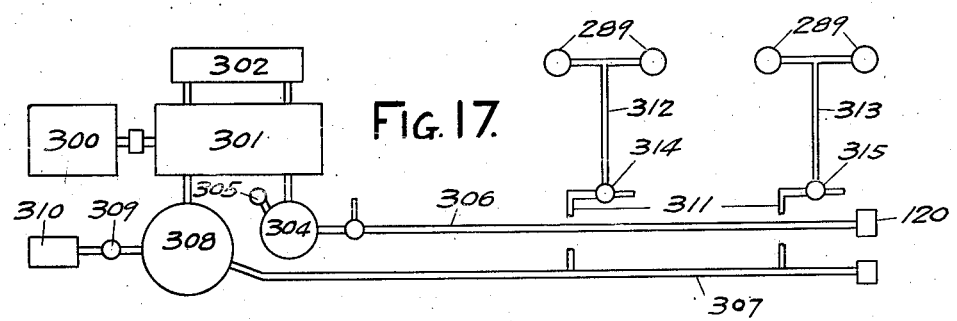
Fig. 17 is a diagram of the compressed air system.

The cylinders 289 may be supplied with compressed air from a pipe 307 as shown in Fig. 17.

As to the construction of the individual pinch rolls 269 and 275, if a separate stand 270 is exclusively used for synchronous operation, the rolls 269 therefor, are preferably made of hardened steel or chilled cast iron, and accurately ground to size, unless such material would mar the surface of the strip, in which case soft steel rolls may be used, the same being sheathed in brass or bronze.

For the asynchronous pinch rolls 275 a similar construction may be used when the rolls are in more or less constant (occasional) use for standard orders of asynchronous length sections.

However, as each accurate asynchronous length section cut requires a separate pair of asynchronous pinch rolls, of a definite and accurate diameter (except as previously noted), I prefer to make the asynchronous pinch rolls 275 in two parts; a standard body portion 295 including the journals 296 and the portion 297 to engage the drive spindles, and a separate outer sleeve 298 which may be made of cast iron, sections of welded steel pipe, or other cheap material for occasional orders, or of hardened steel or bronze for the larger or more frequent orders.

Such sleeves 298, of whatever material, may be simply pressed on the body portion 295, or secured in a variety of ways, as by set screws, spot welding, etc. Such sleeves can be re-turned or reground several times, to suit different asynchronous section lengths, and then discarded. Also such a pair of sleeves may be quickly prepared for an unusual order.

If the synchronous pinch rolls 269 are 40" circumference, or about 12¾" in diameter, and if the maximum percentage of asynchronization used is 5%, the circumference of the asynchronous pinch rolls 275 would vary from 40" to 42", and their maximum diameter would be about 13⅜".

It can now be seen that the gears 271 and 272 may be duplicates of the gears 265 and 266, and the pinions 267 of the pinions 273. It will also be obvious that the asynchronous operation of my improved rotary flying shear differs in no way from its synchronous operation except that different diameters (or pairs) of pinch rolls are used.

In both cases an accurate and definite speed relation is maintained indefinitely between the lineal speed of the bar being cut, and the peripheral speed of the revolving knife carriers and their knives 50 and 70.

It will be further noted, that while I have described as a concrete example, a shear to cut sections from a bar moving at a lineal speed of 3000 ft. per minute, there is no apparent mechanical reason so far evident, why this speed may not be increased to 4000 ft. per minute, or more.

Since centrifugal forces acting on the knives and their holders have little or no effect in this design, and since the air cylinders 85, and the air ports 118 and 100, may be increased in size to permit quicker air flow, and since the inertia of the movable knives 70, and holders 68, is low, I think the above statement as to speed, is conservative.

In this connection it must also be remembered that air cylinders 85 may be applied to both ends of the knife holders 68 by a slight change in design, and that also, half the movable knives 70 may be placed on each of the drums 14 and 15, and thus allow more space for larger cylinders 85.

Since the control chains 195 and associated parts operate at low speeds, they may be run much faster.

It is true that the pitch line speed of the gears 25, 32, and 33, and the drive pinion 259 is high, at a bar speed of 3000 ft. per minute; however these high bar speeds are probably impractical except for thin material, say ⅛" or less in thickness, and in no case, with ample gear width will there be any excessive tooth load on the gears.

It is also appropriate to point out here, that while the main incentive to the present invention was to produce a super high speed shear, the machine is equally well adapted for lower speeds.

Regarding the compressed air supply for the cylinders 85, it will be advisable to provide a separate small automatic motor driven air compressor to supply this air, both because the required pressure will be higher than the usual pressure available at the mills, and also to provide a self-contained and more reliable system.

As dust or foreign matter in the air supply could easily impair the air valves 115 and 120, I prefer to use a closed air system to exclude dirt and to retain lubricating oil, as shown in diagrammatic form in Fig. 17.

The motor 300 drives the compressor 301, which is preferably of the two stage type, and provided with an intercooler 302. The compressed air is led to a tank 304 provided with a safety valve 305. A pipe 306 leads to the supply valve 120, and the air exhausted from the cylinders 85 is returned through a pipe 307 to a larger tank 308, which is provided with a spring check valve 309, which admits air through a strainer 310 when the pressure in the tank 308 falls to about two pounds below atmospheric pressure.

The pressure tank 304 should be placed close to the shear, and preferably, both tanks should be underground.

With this arrangement the air supplied to cylinders 85 is mostly used over and over again, and kept clean, and charged with an oil spray acquired from the compressor cylinders, which also serves to lubricate the valves 115 and 120, and the cylinders 85.

Air for the pinch roll cylinders 289 (in pairs) is supplied through pipes 311, 312, and 313, and controlled by three-way valves 314 and 315, one for each stand of rolls so that either stand may be cut out of, or into action at will.

In the foregoing description I have assumed a range of cut lengths from 10 ft. to 30 ft. inclusive. It can now be seen that synchronous cuts of any length from one foot to 100 feet can be made, varying in length by one foot, by merely providing the appropriate control chain 195 for each of the said lengths.

It will also be apparent that as the apparatus shown is also adapted for much lower speeds, that fewer knives can be used at such lower speeds, and this, combined with a greater percentage of asynchronism, on account of the lessened shock to the mechanism at lower speeds.

We can thus probably obtain a simpler machine on such lines, with the facility for making a complete assortment of asynchronous cuts, or in other words, the ability to cut off any lengths of sections by variations as small as desired.

It is to be noted, that while for illustration, the rotative speed of the shear drums 14 and 15 has been described as 300 R. P. M., the actual speed would be determined by the delivery speed of the mill, and the percentage of asynchronism used. In all cases the shear speed would automatically suit itself to the lineal delivery speed of the bar to be cut, and also to variations of this speed during the cutting cycle of a single bar.

Since accurate control of the speed of the bar 210 is lost when the rear end of the bar emerges from the pinch rolls 270 or 280 (whichever set is in use), I have indicated in dotted lines in Fig. 1 a pair of pinch rolls 252 and 253 the latter being directly under the former, which may be driven by a chain drive or otherwise from one of the drums 14 or 15. These rolls will engage the front end of the last cut section and deliver it.

However, if the rollers of the short tables 321 and 322 (see Fig. 2) between the pinch rolls 270 and 280, and the shear 255, are driven in timed relation to the speed of the drums 14 and 15 (preferably at a slightly higher speed to allow for slippage), the last section of the bar will be fed through the shear and cut off to approximately the same length (preferably slightly longer) as the previously cut sections.

As the upper drum 15 is mounted to float endwise in its bearings in order to center the helical drive gears on the drums 14 and 15, the spring 108 for the distributing valve 115 (see Fig. 5) will produce an unbalanced force against the upper drum 15. In order to balance this force I provide, as shown in Fig. 6, a duplicate spring 331, or at least one of equal tension, mounted in a shell 332, which may fit a counterbore 333 in the end of the trunnion 30, and at the opposite end of the drum 15.

A clamp 334 is secured by bolts 335 to the cover plate 336 of the bearing box 5, and a ball thrust bearing 337 is set in the shell 332, the spring 331 being placed between the bearing 337 and the clamp 334, as shown.

Figure 18:
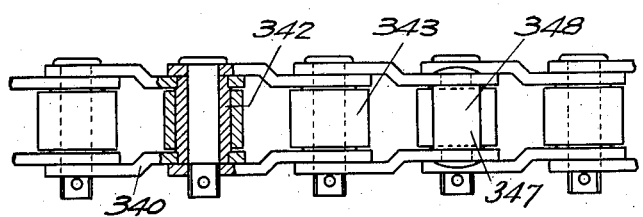
Fig. 18 is a plan of a portion of a control chain.
Figure 19:
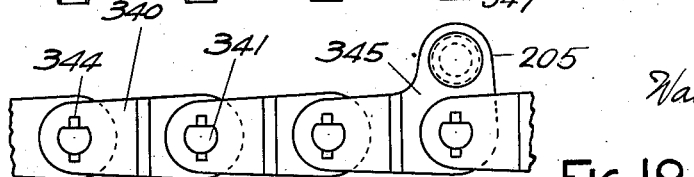
Fig. 19 is an elevation of the same.

In Figs. 18 and 19 I have shown suitable details for the control chains 195. These chains are of the type known as "steel thimble roller chains," and are the kind used for accurate machine drives. They have continuous "offset" links, and are detachable at every link, so they may be readily made up in odd or even pitch lengths.

The standard chain consists of side links 340, pins 341, shouldered bushings 342, rollers 343, and cotter pins 344. To adapt such chains for use as control chains 195, it is necessary to provide spaced special links 345, having upward projections 346, to each pair of which projections is attached a shouldered pin 347 having an enlarged middle portion 348, which may engage the roller 207 on lever 206.

Referring now to Fig. 1, the whole shearing and piling operation may be visualized. The mill 319 delivers the bar 210 to the approach table 320, which carries it to the pinch rolls 280. A short table 321 bridges the gap to the pinch rolls 270, and a second short table 322 carries the bar 210 to the shear 255.

This table 322 is preferably made with its upper surface slightly convex, that is, its middle roller would be ½" to 1" higher than its end rollers.

If a chute instead of a roller table is used, a similar effect is desirable. When making synchronous cuts this effect is not necessary, as the knives and the bar are travelling at exactly equal speeds, but when making asynchronous cuts, the bar 210, according to the present invention, and as previously described, will be travelling at a speed (assumed) 5% to 10% greater than that of the knives 50 and 70. A glance at Fig. 7 will show, that under these conditions, the upper knife 70 will exert a slight retarding effect on the bar 210, tending to make it form an incipient "loop." This action will occur from the time the knives 50 and 70 grip the bar 210 in advance of the position shown, until the upper knife 70 clears it, beyond the position shown (rotatively).

On thin material such as we are considering here, this distance will seldom be more than 3" to each side.

If the operative asynchronism at the moment is 10%, the bar would tend to travel 10% more than the knife movement, or 0.6", which is the amount of the retardation of that portion of the bar only, which lies between the knife 70 and the then operating stand of pinch rolls 280.

The sections cut by the shear 255 are discharged onto a table 323 against an adjustable disappearing stop 324. If the shear is operated at the high speed of 3000 feet per minute as previously assumed, it will be necessary to pile the sections cut from each bar, or else to carry them away in line, one following the other, or to move them in lapped relation at a lower speed.

The table 323 is preferably a lifting table, and over balanced by a counterbalance, and arranged for its vertical motion of about two feet to be controlled by a brake. This table is used for piling the cut sections. Starting with the table in its highest position, it is gradually lowered as the pile forms, until it is on a level or just above the level of the table 325, which is shown containing a pile 326. A second table 327 contains a pile 328.

The piles at 328 may be picked up by a crane and taken elsewhere. The table 325 is provided to hold a pile momentarily until table 327 is empty. All these tables may be of usual construction and driven by electric motors in the usual way.

Operation

The operation of my improved rotary flying shear when making synchronous cuts has already been pretty well indicated. I will now describe briefly its operation when making asynchronous cuts, as for instance, 20' 6".

The delivery speed of the mill 319 is known. The required asynchronism for 20' 6" cuts is 5%, and the appropriate pair of pinch rolls 275 is placed in stand 280 and made ready for operation. The motor 256 is now set to operate at a speed which will drive the pinch rolls 280 at a speed (when the shear is idling) somewhat higher than the speed of the bar 210 (about 5% to 10% higher).

The proper chain 195, to produce 20 ft. base cuts is put in place with one projection 205 in position to start a cutting cycle. Air pressure is supplied to the cylinders 289 of pinch rolls 280, and to valve 120.

When the bar 210 is delivered by the mill 319 and the front end of it reaches the rolls 280, they grip it and retard the shear 255 through the connecting drive members 264, etc., to the desired asynchronous speed, as determined by the asynchronous pinch rolls 275 in use.

This retardation is fully accomplished by the time the front end of the bar 210 (having passed the flag 211 and started the control chain 195) reaches the cutting position, and as each knife cuts, a mechanically operated switch as shown and described in my Patent 1,994,107, supplies a graduated amount of extra current to the motor 256 just sufficient to make the cut. This cutting sequence is repeated for each bar 210.

For synchronous cutting, the operation is similar except that the synchronous pinch rolls 270 are used.

I now desire to call attention to the steady running of my improved rotary flying shear, whether operating either synchronously or asynchronously. During the cutting cycle, the shear drums 14 and 15 may run at a constant uniform speed, except for variations in the speed of the mill rolls, that is, a change in the speed of the bar being cut.

If the mill runs at an exactly uniform speed, the only change in speed of the shear drums 14 and 15 would be that necessary to bring the pinch rolls and the shear, down to the speed of the bar, which change might be as little as two per cent, which is within the speed variation of a closely governed steam engine, and less than that of a commercial electric "constant speed" motor.

This attribute of this machine lends itself admirably to high speed operation, and is conducive to very smooth running, and as before stated, this condition obtains for either synchronous or asynchronous operation.

It will also be noted that if the bars 210 are cut while they are hot, the usual allowance for shrinkage must be made if the cut sections are required to be of accurate lengths when cold.

I will now briefly re-state the underlying principles of the present invention, as follows:

1. The use of spaced multiple shear knives, individually operatable in predetermined sequences, by the use of which a series of base cuts can be made with synchronous operation of the shear knives and the bar being cut.

2. The use of means for accurately synchronizing the peripheral speed of the knives with the lineal speed of the bar to be cut as it is delivered to the shear by the rolls of a rolling mill, in order to insure the accuracy of the said base cuts.

3. The use of means to maintain a definite and constant percentage of asynchronism between the peripheral speed of the shear knives and the lineal speed of the bar to be cut, whereby accurate length sections may be cut having any desired lengths between the said base lengths.

4. The use of means for quickly changing from synchronous to asynchronous operation etc. etc.

The advantages of cutting accurate variable lengths at high bar speeds and direct from the mill rolls, with a comparatively simple and very reliable flying shear will be appreciated by those skilled in the art, who can make variations in the design shown to meet their own special operating conditions.

I claim as my invention:

1. A rotary flying shear adapted for high speed operation, and comprising a pair of parallel rotary knife carrying members mounted on fixed centers, geared together, and provided with a series of equally spaced co-acting knives adapted to make transverse cuts, and to sever a moving metal bar passing between the knife carriers, into a number of equal sections, plus crop ends, and an electric motor connected directly to the shear through gearing only for driving the shear with relation to the speed of the bar so as to produce and to accurately maintain a definite percentage of asynchronism between the lineal speed of the bar and the peripheral speed of the knives.

2. A rotary flying shear adapted for high speed operation, and comprising a pair of parallel rotary knife carrying members mounted on fixed centers, geared together, and provided with a series of equally spaced co-acting knives adapted to make transverse cuts, and to sever a moving metal bar passing between the knife carriers, into a number of equal sections, plus crop ends, and an electric motor connected directly to the shear through gearing only for producing and accurately maintaining a definite percentage of asynchronism between the lineal speed of the bar and the peripheral speed of the knives, and so that the speed of the bar will always be higher than the speed of the knives.

3. A rotary flying shear adapted for high speed operation, and comprising a pair of parallel rotary knife carrying members, mounted on fixed centers, geared together, and provided with a series of equally spaced co-acting knives adapted to make transverse cuts, and to sever a moving metal bar passing between the knife carriers, into a number of equal sections, plus crop ends, means for accurately synchronizing the speed of the knives with the speed of the bar to make base length cuts, in multiples of the knife pitch, and means for producing a definite and controlled asynchronism between the said speeds, to cut sections of a length intermediate of the said base lengths in combination with means for using either set of said speed relations independently of the other.

4. A rotary flying shear arranged to make transverse cuts on the bars delivered to said shear by an adjacent rolling mill to subdivide them into desired equal length sections, a motor for driving said shear, and fixed ratio driving means for producing and accurately maintaining a definite asynchronous relation between the lineal speed of the bar and the peripheral speed of the shear knives, and irrespective of the delivery speed of the mill.

5. The combination of a rolling mill arranged to deliver rolled bars at a convenient speed, a rotary flying shear arranged to make transverse cuts on the said bars to subdivide them into desired equal length sections, and a pair of pinch rolls to engage the bar, prior to its engagement by the shear; the said pinch rolls being geared to the shear in a fixed ratio, and having a surface speed such that the lineal speed of the bar and the peripheral speed of the cutting knives will have a definite asynchronous relation.

6. The combination of a rolling mill arranged to deliver rolled bars at a convenient speed, a rotary flying shear arranged to make transverse cuts on the said bars to subdivide them into desired equal length sections, and a pair of pinch rolls geared to the shear, and arranged to produce exact synchronism between the bar speed and the knife speed, a second pair of pinch rolls in line with the said first pair, also geared to the shear and arranged to produce a definite asynchronous relation between the bar speed and the knife speed, and means for operating the said two pairs of pinch rolls at different times to produce the relations above recited.

7. A rotary flying shear adapted to cut material delivered by a rolling mill, synchronous pinch rolls for the said shear, asynchronous pinch rolls for the same, and means quickly operatable for bringing either set of pinch rolls into operation at will.

8. A rotary flying shear, comprising in combination a pair of parallel rotary knife carrying members, mounted on fixed centers and geared together, and each provided with a cutting knife, one of the said knives being rigidly secured to its carrying member, and the other knife being set to co-act with the said rigid knife, and being adjustable from a normal non-cutting position where its cutting edge is positioned on a lesser radius of the carrying member, to a cutting position where its cutting edge is located on a greater radius of the said carrying member; these two positions being located on different radii.

9. A rotary flying shear, comprising in combination a pair of rotary knife carrying members mounted on fixed centers and geared together, and each provided with a cutting knife, one of the said knives being rigidly secured to its carrying member, and the other knife being mounted in an oscillating knife holder on the opposite carrying member, and being capable of oscillation to position the said knife in a normal non-cutting position, and alternately in a cutting position, with respect to the co-acting rigid knife.

10. A rotary flying shear, comprising in combination a pair of parallel rotary knife carrying members, mounted on fixed centers and geared together, one of the said members having spaced longitudinal slots formed in its periphery, a cutting knife rigidly secured in each of the said slots, and the other of the said knife carrying members having similarly spaced longitudinal bores formed near its periphery, a slot or open space extending from each of the said bores to the periphery of the carrying member, an oscillating knife holder in each of the said bores, a cutting knife in each of the said oscillating knife holders, arranged to co-act with one of the said rigid knives, and means for oscillating each of the said knife holders to position its knife to cut or not to cut.

11. A rotary flying shear adapted to subdivide a moving metal bar by transverse cuts and provided with coacting cutting knives, and means for operating the said knives to cut sections of two predetermined lengths from the same bar in quick succession.

12. A rotary flying shear comprising a pair of oppositely rotating members having coacting shear knives adapted to subdivide a moving metal bar by transverse cuts, feeding means for the bar, and means for operating the shear in a constant and uniform asynchronous relation to the feeding means, said last means including an individual electric driving motor for said shear.

13. A rotary flying shear comprising upper and lower rotary carrying members, a plurality of spaced coacting knives on each of the same, certain of which are adjustable to cut or not to cut, means for bringing selected pairs of knives into action to make a transverse cut on a moving bar passing between the said carrying members, means for driving the said carrying members in synchronous relation to the travel of said bar, means for driving them in asynchronous relation thereto, and means for operating the shear in either of said relations, at will.

14. In a rotary flying shear, a rotary knife carrying member, a cutting knife carried thereby, means for normally securing the knife in place, and means operative upon the failure of the said securing means for retaining the knife on the said carrying member against the action of centrifugal force.

15. In a rotary flying shear, the combination of upper and lower knife carrying drums, a series of three or more rigidly attached knives on one of the said drums, and a series of three or more adjustably mounted knives on the other of the said drums, the said latter knives co-acting with the said rigid knives to make transverse cuts on a moving bar in desired sequences.

16. A rotary flying shear adapted to subdivide the product of a rolling mill direct from the mill rolls, means for operating the shear in exact synchronism with the mill delivery, and alternative means for operating the shear in a fixed and constantly maintained asynchronism thereto.

17. A rotary flying shear comprising in combination, a pair of parallel rotary knife carrying members, geared together and provided with ten co-acting pairs of cutting knives arranged to make transverse cuts on a moving bar passing between the said carrying members, means for operating the said carrying members in synchronous relation to the speed of the bar, and alternative means for operating them in asynchronous relation thereto.

18. A rotary flying shear comprising in combination, a pair of parallel rotary knife carrying members, mounted on fixed centers and geared together, one above the other, a plurality of rigidly attached knives on the lower carrier, a plurality of oscillating knives on the upper carrier, adjustable to cut or not to cut, an air cylinder attached to each of the said adjustable knives for effecting the said adjustment, air valves for supplying the said cylinders with compressed air, and a timing device for controlling the flow of the air through the said valves in order to control the cutting sequence of the knives.

19. A rotary flying shear comprising in combination, a pair of parallel rotary knife carrying members mounted on fixed centers and geared together, one above the other, a plurality of rigidly attached knives on the lower carrier, a plurality of adjustable knives on the upper carrier, air operated mechanism for adjusting the said knives to cut or not to cut, a sprocket driven at a fixed speed ratio with the rotary knife carriers, a chain driven by the said sprocket, and spaced projections on the said chain for controling the air operated knife adjusting mechanism, and thereby the cutting sequence of the knives.

20. A rotary flying shear comprising a pair of parallel rotary knife carrying members mounted one above the other on fixed centers and geared together, a plurality of cutting knives on each of the said carrying members, the knives of one member co-acting respectively with the knives of the other member, means for adjusting at least one knife of each co-acting pair to cut or not to cut, means for feeding a bar to the shear to be cut transversely, and air operated means put in operation by the front end of the advancing bar for starting a cutting cycle.

21. A rotary flying shear comprising a pair of parallel rotary knife carrying members mounted one above the other on fixed centers and geared together, a plurality of cutting knives on each of the said carrying members, the knives of one member co-acting respectively with the knives of the other member, means for adjusting at least one knife of each co-acting pair to cut or not to cut, means for feeding a bar to the shear to be cut transversely, a control chain controlling the operation of the said knife adjusting means, means for stopping the said control chain after the passage of each bar through the shear in a position to promptly start a new cutting cycle, and means actuated by the front end of the next advancing bar for setting the control chain in motion to start the said cutting cycle.

22. A rotary flying shear comprising a pair of parallel rotary knife carrying members mounted one above the other on fixed centers and geared together, a plurality of cutting knives on each of the said carrying members, the knives of one member co-acting respectively with the knives of the other member, means for adjusting at least one knife of each co-acting pair to cut or not to cut, means for feeding a bar to the shear to be cut transversely, means for starting a cutting cycle with any co-acting pair of knives, and a control chain, said chain being readily removable for the substitution of any one of a number of control chains.

23. A rotary flying shear comprising a pair of parallel rotary knife carrying members mounted one above the other on fixed centers and geared together, a plurality of cutting knives on each of the said carrying members, the knives of one member co-acting respectively with the knives of the other member, means for adjusting at least one knife of each co-acting pair to cut or not to cut, means for feeding a bar to the shear to be cut transversely, means for starting a cutting cycle with any co-acting pair of knives, and a control chain, said chain being readily removable for the substitution of any one of a number of control chains to change the length of the sections cut, projections on the said chains so spaced as to determine the lengths of the cut sections, and means for stopping the said chain after the passage of each bar, with one of the said projections in position to promptly start a new cutting cycle.

24. A rotary flying shear comprising a pair of parallel rotary knife carrying members mounted one above the other on fixed centers and geared together, a plurality of cutting knives on each of the said carrying members, the knives of one member co-acting respectively with the knives of the other member, means for adjusting at least one knife of each co-acting pair to cut or not to cut, means for feeding a bar to the shear to be cut transversely, means whereby any pair of co-acting knives may start a cutting cycle, means actuated by the front end of each bar to animate the said cycle starting means, and means whereby the same means which is actuated to start a cutting cycle by the front end of the bar, may be used to end the said cycle and return the said controlling means to a starting position by the passage of the rear end of the bar.

25. A rotary flying shear comprising a pair of parallel rotary knife carrying members mounted one above the other on fixed centers and geared together, a plurality of cutting knives on each of the said carrying members, the knives of one member co-acting respectively with the knives of the other member, means for adjusting at least one knife of each co-acting pair to cut or not to cut, means for feeding a bar to the shear to be cut transversely, means comprising a control chain with spaced projections for selectively controlling the said knife adjustments, means for driving the said chain in timed relation to the rotation of the knife carrying members, said means including a clutch and a brake, and interlocking means which prevent the application of the brake until the clutch has been fully disengaged.

26. A rotary flying shear adapted to make spaced transverse cuts on a moving metal bar to subdivide the same into desired sections, including a pair of rotary knife carrying members, placed one above the other and rotating on fixed centers, and between which the moving bar may pass to be sheared, a double helical gear secured to one of the said knife carrying members, two single helical gears placed side by side on the other knife carrying member, and each meshing with one side of the said double helical gear, and means for drawing the two single helical gears together at intervals to eliminate backlash between the teeth of the upper and lower gears.

27. A rotary flying shear adapted to make spaced transverse cuts on a moving metal bar to subdivide the same into desired sections, including a pair of parallel knife carrying members placed one above the other, rotating on fixed centers, and geared together, and between which the moving bar may pass to be sheared; the said lower knife carrying member being mounted in bearings designed to prevent end motion of the said carrying member; the said upper carrying member being mounted in bearings designed to permit limited end motion of the said upper carrier, and a driving shaft geared to the said lower carrier and mounted to permit limited end motion of itself in its bearings.

28. A rotary flying shear comprising in combination a pair of rotary knife carrying elements, supporting means and driving means therefor, an automatically adjustable knife mounted on one of the said carrying elements, means for adjusting the said knife to cut or not to cut, and means for controlling the said adjusting means, and including a toothed clutch magnetically operated.

29. A rotary knife shear comprising in combination a pair of rotary knife carrying elements, supporting means and driving means therefor, spaced automatically adjustable knives mounted on one of the said carrying elements, means for adjusting each of the said knives to cut or not to cut, and means for controlling the said adjusting means including a toothed clutch magnetically operated and driven in a fixed ratio from one of the said carrying elements, and having such a number of teeth that when the clutch rotates, one of its teeth will pass a fixed point for each of the said adjustable knives as they pass a fixed point.

30. A rotary flying shear comprising in combination a pair of rotary knife carrying elements, supporting means and driving means therefor, spaced automatically adjustable knives mounted on one of the said carrying elements, means for adjusting each of the said knives to cut or not to cut, and means for controlling the said adjusting means, including a toothed clutch magnetically operated, a sprocket driven by the said clutch, a chain driven by the said sprocket, spaced projections on the said chain adapted to actuate the said controlling means; the number of teeth on the said clutch and the said sprocket, and the ratio of the drive to the said clutch being such that a link of the said chain, when running, will pass a fixed point for each of the said knives which pass a fixed point, in constant synchronism.

31. A rotary flying shear comprising in combination a pair of rotary knife carrying members, supporting means and driving means therefor, an automatically adjustable knife mounted on one of the said carrying members, an air cylinder for adjusting the said knife, and an air valve controlling the introduction of the air to the said cylinder in such a way that the air works expansively.

32. A rotary flying shear comprising in combination a pair of rotary knife carrying members, supporting means and driving means therefor, an automatically adjustable knife mounted on one of the said carrying members, an air cylinder for adjusting the said knife to cut or not to cut, an air valve controlling the admission of compressed air to the said cylinder, and means for rapidly opening and closing the said air valve, whereby the air is quickly introduced and does nearly all its work by expansion after the valve is closed.

33. A rotary flying shear comprising in combination a pair of rotary knife carrying members, supporting means and driving means therefor, an automatically adjustable knife mounted on one of the said carrying members, an air cylinder for adjusting the said knife to cut or not to cut, an air valve controlling the admission of compressed air to the said cylinder, means for rapidly opening and closing the said air valve, a second air valve for supplying the first mentioned valve with compressed air, and means for automatically operating the said second air valve.

34. A rotary flying shear, a motor for driving the same, stand of synchronous pinch rolls, and a stand of asynchronous pinch rolls, both in tandem relation to the shear and for alternately engaging the bar to be cut to register the shear speed with the bar speed, and duplicate drive gears connecting the said two stands of pinch rolls with the said shear driving motor.

35. A rotary flying shear comprising in combination a pair of rotary knife carrying elements, supporting and driving means therefor, an automatically adjustable knife mounted on one of the said carrying elements, means including an air operated cylinder for adjusting the said knife to cut or not to cut, a rotary air valve for supplying compressed air to the said cylinder at desired intervals, and mounted on the rotary element which carries the adjustable knife, and a timing device driven from the other of the said rotary carrying elements, including an air supply valve, and arranged to supply compressed air to the said cylinder when a cut is to be made.

36. A rotary flying sheer comprising in combination, a pair of rotary knife carrying members, one above the other, supporting means and driving means therefor, a knife mounted on the upper carrying member, means including an air operated cylinder for adjusting the said knife to cut or not to cut, a rotary air valve for supplying air to the said cylinder at desired intervals and mounted on the upper carrying member, and a timing device driven from the lower carrying member including an air supply valve, and arranged to supply the said cylinder with compressed air when a cut is to be made.

37. A rotary flying shear, a motor for driving the same, a stand of pinch rolls for registering the speed of the shear and the speed of the bar, control mechanism to determine the timing of the cuts, driving connections between the motor and the shear, and between the shear and the pinch rolls; the said drives being at one end of the shear, and the said controls being at the other end thereof.

38. A rotary flying shear comprising in combination a pair of rotary knife carrying members, supporting means and driving means therefor, an automatically adjustable knife mounted on one of the said carrying members, an air cylinder for adjusting the said knife to cut or not to cut, and mounted on one end of the said carrying member, and a gear on the opposite end of each of the said carrying members and meshing with each other to connect the two carrying members.

39. A rotary flying shear comprising a pair of rotary knife carrying drums mounted one above the other, means for supporting and means for driving the same, a knife on one of the said drums automatically adjustable to cut or not to cut, means for adjusting the said knife, and controlling means for the said adjusting means including a chain with spaced projections, the said chain operating at a level between the centers of the two knife carrying drums.

40. A rotary flying shear comprising in combination a pair of rotary knife carrying members, supporting means and driving means therefor, an automatically adjustable knife mounted on one of the carrying members, an air cylinder for adjusting the said knife to cut or not to cut, a distributing valve for supplying air to the said cylinder at desired intervals, and means whereby the said air valves may be quickly removed from their supports in case of damage, and other valves substituted therefor.

41. A rotary flying shear comprising in combination a pair of rotary knife carrying members, supporting means and driving means therefor, an automatically adjustable knife mounted on one of the said carrying members, means for adjusting the said knife to cut or not to cut, and control mechanism for the said adjusting means driven by helical gears from one of the said rotary carrying members, and including a helical gear movable along its shaft to angularly adjust the said control mechanism.

42. A rotary flying shear comprising a pair of rotary knife carrying members, a frame for supporting the same, a cutting knife on each of the said carrying members, driving means for the said carrying members, and an opening in the said frame to permit endwise removal of the said knives.

43. A rotary flying shear comprising in combination a pair of rotary knife carrying members, knives thereon, means for adjusting one or more of the said knives to cut or not to cut, means for supporting and means for driving the said carrying members, means for controlling the said adjusting means including a chain having spaced projections, said chain being readily removable for the substitution of any one of a number of similar chains, a shaft driven from one of the said carrying members for driving one of the said chains, a sprocket on the said shaft, a take-up, and an idle sprocket mounted on the said take-up.

44. A rotary flying shear comprising in combination a pair of rotary knife carrying members, knives thereon, means for adjusting one or more of the said knives to cut or not to cut, means for supporting and means for driving the said carrying members, means for controlling the said adjusting means including a chain having spaced projections, said chain being readily removable for the substitution of any one of a number of similar chains, a shaft driven from one of the said carrying members for driving one of the said chains, an overhung sprocket on the said shaft, a take-up, and an overhung idler sprocket mounted on the said take-up; the said sprockets being overhung to facilitate changing the chains.

45. A rotary flying shear comprising in combination a pair of rotary knife carrying drums, mounted one above the other, spaced rigid knives on the lower drum, spaced knives on the upper drum adjustable to cut or not to cut, an air cylinder for adjusting each of the said adjustable knives, a machined seat on one end of the upper drum for each of the said cylinders, a trunnion or shaft for the upper drum, an air distributing valve for the said cylinders mounted on the end of the said trunnion, and integral ports formed in the said trunnion to connect the said air valve with each of the said air cylinders.

46. A rotary flying shear comprising in combination a pair of rotary knife carrying drums, mounted one above the other, spaced rigid knives on the lower drum, spaced knives on the upper drum adjustable to cut or not to cut, an air cylinder for adjusting each of the said adjustable knives, a trunnion at each end of the said upper drum, an air distributing valve mounted to engage one of the said trunnions and including a spring pressed valve member, and an opposed spring pressing in the reverse direction against the opposite trunnion of the upper drum to neutralize the pressure of the said valve member spring.

47. A rotary flying shear comprising in combination a pair of rotary members, one of the said members carrying a rigidly attached knife, and the other member carrying a knife adjustable to cut or not to cut, an air cylinder for adjusting the said adjustable knife, means for supplying air to the said cylinder at desired intervals to make a cut, means for exhausting the said air when the cut has been made and a spring for returning the said knife to its inoperative position; the said cylinder and the said spring being detachable as a unit for inspection or adjustment.

48. A rotary flying shear comprising in combination a pair of rotary members, one of the said members carrying a rigidly attached knife, and the other member carrying a knife adjustable to cut or not to cut, an air cylinder for adjusting the said adjustable knife, means for supplying air to the said cylinder at desired intervals to make a cut including a rotary valve for distributing the compressed air from a fixed point to the cylinder on the rotary member, and a stationary timing valve for supplying air at the intervals necessary to make the desired cuts.

49. A rotary flying shear comprising in combination a pair of rotary members, one of the said members carrying a rigidly attached knife, and the other member carrying a knife adjustable to cut or not cut, an air cylinder for adjusting the said adjustable knife, means for supplying air to the said cylinder at desired intervals to make a cut, including a rotary valve for distributing the compressed air from a fixed point to the cylinder on the rotary drum, and a stationary quick acting multi ported gridiron timing valve for supplying the air at the intervals necessary to make the desired cuts.

50. The combination of a rotary flying shear with a stand of pinch rolls for registering the speed of the shear with the speed of the bar to be sheared, a motor, driving connections between the said motor and the said shear, and between the said motor and the said pinch rolls; the individual rolls of the said stand being made in two parts, a body portion and an exterior shell or sheath, for economy in upkeep or to protect the surface of the bar being cut.

51. The combination of a rotary flying shear with a stand of asynchronous pinch rolls to maintain a definite asynchronism between the speed of the shear and the speed of the bar to be cut, a motor, driving connections between the motor and the said pinch rolls, driving connections between the motor and the shear; the individual rolls of the said stand being made in two parts, a body portion of a standard size and an exterior sheath of a size determined by the degree of asynchronism required to make the desired cuts.

52. The combination of a rotary flying shear with a stand of asynchronous pinch rolls to maintain a definite asynchronism between the speed of the shear and the speed of the bar to be cut, a motor, driving connections between the motor and the said pinch rolls, driving connections between the motor and the shear; and a pair of air cylinders for producing the required pressure between the two pinch rolls.

53. The combination of a rotary flying shear with a stand of pinch rolls to maintain a definite relation between the speed of the shear and the speed of the bar being cut, a motor, driving connections between the motor and the pinch rolls, driving connections between the motor and the shear, and a pair of air cylinders for producing the required pressure between the two pinch rolls of the said stand.

54. The combination of a rotary flying shear with a stand of pinch rolls to maintain a definite relation between the speed of the shear and the speed of the bar being cut, a motor, driving connections between the motor and the pinch rolls, driving connections between the motor and the shear, a pair of air cylinders for producing the required pressure between the pinch rolls, and liners for limiting the bite of the said rolls.

55. A rotary flying shear comprising in combination a pair of rotary knife carrying members, a cutting knife on each of the said members, at least one of the said knives being adjustable to cut or not to cut, means for adjusting the said adjustable knife, and means for controlling the said adjusting means including a constant running gear and a constant running magnetic clutch member driven thereby.

56. A rotary flying shear comprising in combination a pair of rotary knife carrying members, a cutting knife on each of the said members, at least one of the said knives being adjustable to cut or not to cut, means for adjusting the said adjustable knife, and means for controlling the said adjusting means including a constant speed shaft whose speed remains the same for all lengths of cut sections.

57. A rotary flying shear comprising in combination a pair of rotary knife carrying members, a cutting knife on each of the said members, at least one of the said knives being adjustable to cut or not to cut, means for adjusting the said adjustable knife, means for operating the shear in exact synchronism with the speed of the bar to be cut, means for operating the shear asynchronously with respect to the bar, and means for controlling the said knife adjusting means including a shaft driven in a fixed ratio to the speed of the knife carrying elements.

58. A rotary flying shear comprising in combination a pair of rotary drums, knives on each of the same, certain of the said knives being rigidly attached to the drum they are on, and others of the said knives being adjustable to cut or not to cut, air cylinders for adjusting each of the said adjustable knives, a timing valve for the air supply to the said cylinders, and control means for the said timing valve including valve operating means, a magnetic clutch and a magnetic brake for starting and stopping the said valve control means, a flag for closing a circuit to actuate the said magnetic clutch, and a hold on circuit for the said clutch.

59. A rotary flying shear comprising a pair of rotary knife carrying members, co-acting shear knives carried thereby, certain of the said knives being capable of movement with respect to their carriers to position them to cut or not to cut, and mechanism including a sprocket chain having spaced projections, and detachable at every link for controlling the said relative movement of the said knives.

60. The combination with a rotary flying shear arranged to make transverse cuts on a moving metal bar, of a pair of pinch rolls for registering the speed of the bar and the speed of the shear in a fixed relation, air operated mechanism to provide an elastic pinch for the said pinch rolls, air operated mechanism to control the cutting sequence of the shear knives, and an independent air compressor to supply compressed air to the said air operated mechanisms.

61. The combination of a rotary flying shear, a stand of pinch rolls ahead of the shear to register the speed of the shear with the speed of the bar to be cut, in a definite relation, a side shaft, a pair of bevel gears connecting the shear and the side shaft, a second pair of bevel gears connecting the side shaft and the pinch rolls, and a motor geared to the shear to drive all the above mechanism.

62. The combination of a rotary flying shear, a motor geared to the shear to drive the same, a stand of pinch rolls ahead of the shear to register the speed of the shear and the speed of the bar to be cut in a definite relation, a short shaft, a spindle connecting the said shaft with the shear, a side shaft, a pair of bevel gears connecting the said short shaft with the said side shaft, a pinion stand, a pair of bevel gears connecting the said side shaft and the said pinion stand, and spindles connecting the pinions of the said pinion stand with the rolls of the said stand of pinch rolls.

63. The combination with a rotary flying shear of two stands of pinch rolls in tandem relation to each other and to the shear, a side shaft, driving connections between the shear and the said shaft, driving connections between the said side shaft and each of the said stands of pinch rolls, and a motor in driving connection with the shear.

64. The combination with a rotary flying shear of two stands of pinch rolls in tandem relation to each other and to the shear, a side shaft, driving connections between the shear and the said shaft, a stand of 3-high drive pinions for each stand of pinch rolls, spindles connecting the two upper pinions of each set with the corresponding pair of pinch rolls, bevel gears connecting each lower pinion of a set with the side shaft, and a motor in driving connection with the shear.

65. In a rotary flying shear the combination of a pair of rotary knife carrying members, each provided with evenly spaced knives, the knives carried by one member co-acting respectively with the knives on the other carrying member, means for supporting and means for driving the said carrying members, to make transverse cuts on a moving metal bar, and means for cutting different length sections from the same bar in quick succession with the same set of evenly spaced knives.

66. In a rotary flying shear, the combination of a pair of rotary knife carrying members each provided with evenly spaced knives, the knives carried by one member co-acting respectively with the knives on the other carrying member to make transverse cuts on a moving metal bar, means for supporting and means for driving the said carrying members, and means for operating certain pairs of knives to cut equal numbers of sections of two different lengths from the same bar.

67. In a rotary flying shear, the combination of a pair of rotary knife carrying members each provided with evenly spaced knives, the knives carried by one member co-acting respectively with the knives on the other carrying member to make transverse cuts on a moving metal bar, means for supporting and means for driving the said carrying members, and means for operating certain pairs of knives to cut sections of two different lengths from the same bar, either alternately, a longer one and a shorter one, or in two groups of even length.

68. In a rotary flying shear the combination of a pair of rotary knife carrying members each provided with evenly spaced knives, the knives carried by one member co-acting respectively with the knives on the other carrying member to make transverse cuts on a moving metal bar, means for supporting and means for driving the said carrying members, and means for operating certain pairs of knives to cut unequal numbers of sections of two different lengths from the same bar.

69. Shearing apparatus for rolling mills, comprising the combination of a rotary flying shear adapted to cut transverse sections of predetermined length from a moving metal bar, a pair of pinch rolls in tandem relation to the shear to register the speed of the shear with the speed of the bar to be cut in a definite relation, whereby accurate length sections may be cut, a motor, driving connections between the motor and the shear and between the motor and the pinch rolls, and means for applying a fluid hotter than the pinch rolls to said pinch rolls to increase the circumference of the said pinch rolls while running to lengthen the sections being cut, independently of other adjustments.

70. Shearing apparatus for rolling mills, comprising the combination of a rotary flying shear adapted to make transverse cuts on a moving metal bar to produce sections of predetermined length, a pair of pinch rolls in tandem relation to the shear to register the speed of the shear with the speed of the bar to be cut in a definite relation, whereby accurate length sections may be cut, a motor, driving connections between the motor and the shear and between the motor and the pinch rolls, and means for applying a fluid colder than the pinch rolls to said pinch rolls to decrease the circumference of the said pinch rolls while running, to shorten the sections being cut, independently of other adjustments.

71. Shearing apparatus for rolling mills, comprising the combination of a rotary flying shear adapted to make transverse cuts on a moving metal bar to produce sections of predetermined length, a pair of pinch rolls in tandem relation to the shear to register the speed of the shear with the speed of the bar to be cut in a definite relation, whereby accurate length sections may be cut, a motor, driving connections between the motor and the shear and between the motor and the pinch rolls, and means for applying heat to increase the circumference of the pinch rolls while running, to lengthen the sections being cut.

72. Shearing apparatus for rolling mills, comprising the combination of a rotary flying shear, adapted to make transverse cuts on a moving metal bar to produce sections of predetermined length, a pair of pinch rolls in tandem relation to the shear to register the speed of the shear with the speed of the bar to be cut in a definite relation, whereby accurate length sections may be cut, a motor, driving connections between the motor and the shear and between the motor and the pinch rolls, and means for applying cooling water to said pinch rolls to decrease their circumferences while running to shorten the sections being cut.

73. Shearing apparatus for rolling mills, comprising the combination of a rotary flying shear adapted to make transverse cuts on a moving metal bar to produce sections of predetermined length, a pair of pinch rolls in tandem relation to the shear to register the speed of the shear with the speed of the bar to be cut in a definite relation, whereby accurate length sections may be cut, a motor, driving connections between the motor and the shear and between the motor and the pinch rolls, and means for controlling the circumference of the pinch rolls while running, said means applying a heating or cooling medium to the said rolls for the purpose of holding them at an even circumference to preserve the exact lengths being cut, or to increase their perimeter to lengthen the sections being cut, or to decrease their perimeter to shorten the sections being cut, at will.

74. A rotary flying shear comprising a pair of rotary knife carrying members, co-acting shear knives carried thereby, certain of the said knives being capable of movement with relation to their carriers to position them to cut or not to cut, mechanism controlling the said relative knife movement operated by compressed air, and supplementary control mechanism operated by electricity.

75. In a rotary flying shear, a pair of rotary knife carrying drums arranged for opposite simultaneous rotation, a series of four evenly spaced knives on one of the drums, a second series of four evenly spaced knives on the other drum, means for operating the said knives selectively in pairs, and in a desired sequence to make transverse cuts on a moving bar fed between the drums, means for feeding the bar to the shear at a speed asynchronous to the peripheral speed of the knives, and of such a percentage of asynchronism as to cut sections of desired length, and means for driving the drums at a speed within the upper limit of successful operation for the shear.

76. In a rotary flying shear, a plurality of pairs of coacting knives, means for causing said knives to cut in selective sequences, means for feeding the bar to the shear at a substantially uniform speed, means for driving the shear at a speed asynchronous to the bar speed to cut sections of a certain length, and means for varying the asynchronous relation between the said speeds.

77. A drum type rotary shear having a plurality of spaced pairs of coacting knives, means for operating the said knives in selective sequences to cut a range of desired length sections from stock fed to the shear, means for driving the shear at a certain speed, means for feeding the stock to the knives at a speed having a degree of asynchronism to the peripheral speed of the knives such that the desired range of section lengths may be successfully cut, the said knives being spaced at such a pitch as to limit the degree of asynchronism necessary to cut the desired range of section lengths to an amount which can be used successfully at the speed set by the feeding means.

78. The combination of a rolling mill which delivers rolled stock at a speed set by desired operating conditions at the mill itself, with a drum type rotary flying shear provided with a plurality of pairs of spaced coacting knives, means for operating the said pairs of knives in selective sequences to cut sections of a desired range of lengths from the stock, and means for driving the shear at a speed asynchronous to the delivery speed of the mill, whereby desired section lengths may be cut, the pitch of the said knives being such that the degree of asynchronism between the speed of the stock and the speed of the knives required to cut the desired section lengths, will be within the limits of successful operation for the size and character of the stock, and for the delivery speed of the mill.

79. The method of operating a rotary flying shear to cut sections of predetermined length from a moving bar, comprising the use of an allowable percentage of asynchronism between the speed of the bar and the speed of the knives to produce the desired section length, in combination with the selective use of various pairs of knives for the same purpose, and at the same time.

80. The method of operating a rotary flying shear at high speed to cut variable length sections from a moving bar, comprising the use of asynchronous speeds between the bar and the shear, and the limitation of the percentage of asynchronism used to within desirable practical limits by the simultaneous selective use of various knife pairs.

81. In the method of shearing, the steps consisting in feeding material by the rolls of a rolling mill to be sheared by a rotary shear having no power connection with said mill, driving the shear by a separate motor, and limiting the speed of the shear in accordance with the speed of feeding the material.

82. In the method of shearing, the steps consisting in feeding material to be sheared, from the rolls of a rolling mill to a rotary shear having no power connection with said mill and which rotates constantly when cuts are to be made, driving said shear by a separate motor, and restraining the shear during the cutting periods to a speed having a predetermined ratio to the speed of the material being fed by the mill rolls.

83. In the method of shearing, the steps consisting in feeding material directly from the rolls of a rolling mill to a rotary shear, driving the mill by an electric motor, driving the shear by a separate electric motor, and automatically retarding the shear to a predetermined fixed speed ratio with the speed of the mill rolls.

84. In the method of shearing, the steps consisting in feeding material directly from the rolls of a rolling mill to a rotary shear, driving the mill by an electric motor, driving the shear by a separate electric motor, and automatically retarding the shear to a predetermined asynchronous speed ratio with the mill rolls.

WALTER W. MACFARREN.

CERTIFICATE OF CORRECTION.

Patent No. 2,274,452. February 24, 1942.

WALTER W. MACFARREN.

It is hereby certified that error appears in the printed specification of the above numbered patent requiring correction as follows: Page 6, second column, line 31, for "0.1514" read --.01514--; page 14, first column, line 31, claim 29, for "rotary knife" read --rotary flying--; and second column, line 22, claim 34, after "same," insert --a--; and that the said Letters Patent should be read with this correction therein that the same may conform to the record of the case in the Patent Office.

Signed and sealed this 23rd day of June, A. D. 1942.

(Seal)

Henry Van Arsdale,
Acting Commissioner of Patents.

CERTIFICATE OF CORRECTION.

Patent No. 2,274,452. February 24, 1942.

WALTER W. MACFARREN.

It is hereby certified that error appears in the printed specification of the above numbered patent requiring correction as follows: Page 3, first column, lines 15 to 18 inclusive, strike out "Fig. 20 is a view partly in vertical section, of a modified form of pinch rolls wherein their diameters are controlled by temperature changing means." and insert instead the following -

Figure 20:
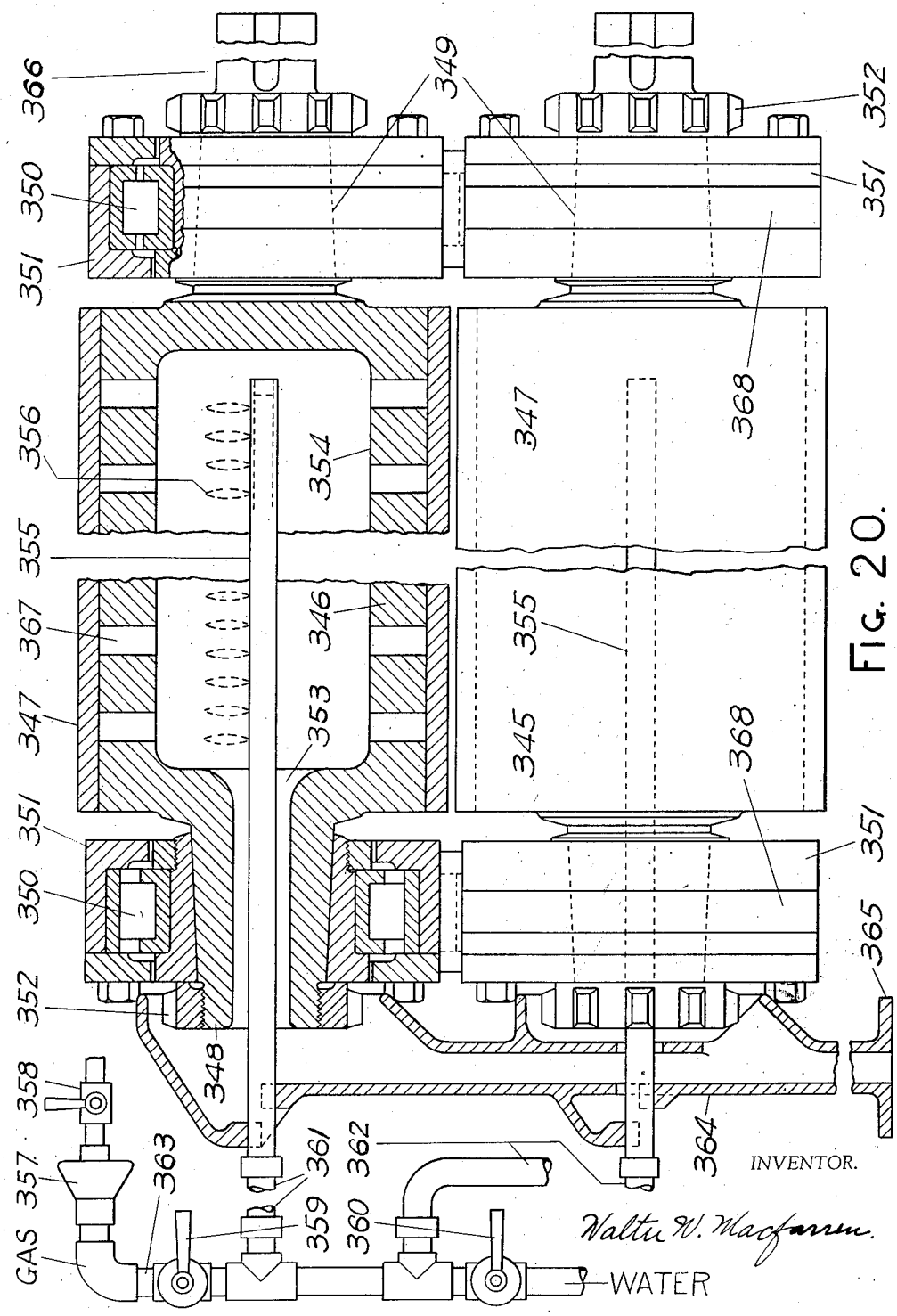
Fig. 20 is a view partly in vertical section, of a modified form of pinch rolls wherein their diameters are controlled by temperature changing means.

--Fig. 20 is an elevation, partly in section, of a pair of pinch rolls of modified form and arrangement, showing means for changing their circumferences by modification of their temperature.-- page 9, second column, line 44, after "knives 50 and 70." insert the following paragraphs -

--In Fig. 20 I have shown a modified form of pinch rolls which have special advantages when very accurate cuts are to be made, and which may be used in place of the pinch rolls 269 and 275, if desired.

In the ordinary operation of a hot strip mill, the product is delivered at a fairly uniform temperature, so that the allowance made in the circumferences of the pinch rolls 269 and 275 for shrinkage of the cut sections in cooling, will produce accurate length sections when cold.

However, the temperature of the bar as delivered from the mill, may vary somewhat, and also as the pinch rolls when new are of one diameter, and as they wear become smaller, a correction may become desirable.

To neutralize both of these variables, I have shown in Fig. 20 means for controlling, to a limited extent, the circumferences of the pinch rolls by control of their temperature, with means for increasing or decreasing these temperatures to make the rolls larger or smaller, as conditions may demand, and when in operation.

To these ends the rolls 345 may have body portions 346, and sheaths or outer shells 347. Each roll body 346 is provided with a pair of tapered trunnions 348 and 349, on which are mounted detachable roller bearings 350, carried in bearing boxes 351, and secured to the trunnions 348 and 349 by threaded collars 352.

The trunnions 349 may be solid, but the trunnions 348 each have a hollow core 353 passing through them, and connecting with the hollow interior 354 of the roll.

A pipe 355 passes through each of the cores 353, to the interior hollow space 354, and these pipes may be supplied either with cooling water, or with a combustible mixture of gas and air, as will appear later. The series of small outlines 356 in dotted lines above the pipe 355, may represent either gas flames or water sprays, as they emerge from small holes in the upper side of the pipe, the end of the pipe being plugged.

Referring to the supply pipes 363 at the left of Fig. 20, 357 is a mixer for the gas and air, and 358 is a gas supply and regulating cock. The valves 359 and 360, and flexible connecting members or hoses are shown at 361 and 362, each leading to one of the pipes 355.

By closing the valve 359, and opening the valve 360, cooling water may be supplied to both pipes 355; and by closing the valve 360, and opening the valves 358 and 359, a gas mixture may be supplied to the pipes 355, to burn in the hollow interior 354 of the rolls.

The flexible connections 361 and 362 allow the two pipes 355 to be inserted or withdrawn while the rolls are in operation, the supply pipe 363 being set back (in the plane of the section) and being long enough to permit this. The products of combustion, when gas is used, escape through the cores 353.

When cooling water is used, the water also passes out this way, and falls into openings in a hollow stand 364, which may connect with a sewer. The stand 364 has a base flange 365, which may be bolted to the bedplate 279. The rolls 345 may be driven from their projecting ends 366. Tongues 368 are provided on the bearing boxes 351 to fit a groove in their housings.

The bearings 350 at the left end of the rolls 345 permit end motion of the trunnions 348 to allow for expansion and contraction, and the bearings 350 at the right end of the rolls holds that end against end motion.

In order to insure that the heating and cooling effect is carried directly to the outer shells 347 of the rolls 345, a number of small cores 367 are formed in the outer wall of the roll body 346.

When using gas in the rolls 345 after having used water in them, the pipes 355 may be withdrawn and drained of water before admitting the gas, and the water trapped in the hollow spaces 354, may be siphoned out, or allowed to evaporate.

It may be thought that the above described temperature controlled adjustments are trivial, but this is not the case. If the circumference of the pinch rolls 270 (or 345) is about 40"

as herein previously assumed, then for a change in temperature of 100 degrees Fahrenheit, the circumference of the roll will change about .025" or 25/1000", which is not very much in itself, but when multiplied by five for a 200" (16'-8") cut section becomes .125" or 1/8" per 100 deg. Fahr. for this length section.

As a temperature change of 200 deg. Fahr. will probably be easy to obtain, the possible correction becomes 1/4", and as this may be applied either plus or minus, that is, either to lengthen or to shorten the sections cut, it may become an important operating factor.

It can be seen, that by these means, changes in the delivery temperature of the bar can be compensated for, and longer service can be obtained from the pinch rolls 345 as their wear can be to some extent, compensated for.

It is also probable that fewer pairs of pinch rolls will be required to cut the desired section lengths, as lengths within the range of the above described temperature adjustments may be cut with the same pair of pinch rolls.

and that the said Letters Patent should be read with this correction therein that the same may conform to the record of the case in the Patent Office.

Signed and sealed this 11th day of August, A. D. 1942.

(Seal)

Henry Van Arsdale.
Acting Commissioner of Patents.